(12) United States Patent
Powers

(10) Patent No.: US 11,415,409 B1
(45) Date of Patent: Aug. 16, 2022

(54) APPARATUSES AND METHODS FOR MEASURING PARAMETERS OF AN OBJECT

(71) Applicant: Charles S. Powers, Shreveport, LA (US)

(72) Inventor: Charles S. Powers, Shreveport, LA (US)

( * ) Notice: Subject to any disclaimer, the term of this patent is extended or adjusted under 35 U.S.C. 154(b) by 64 days.

(21) Appl. No.: 16/994,861

(22) Filed: Aug. 17, 2020

Related U.S. Application Data

(60) Provisional application No. 62/890,148, filed on Aug. 22, 2019.

(51) Int. Cl.
| | | |
|---|---|---|
| G01B 11/24 | (2006.01) | |
| G01B 11/00 | (2006.01) | |
| G01B 11/02 | (2006.01) | |
| B23Q 15/12 | (2006.01) | |

(52) U.S. Cl.
CPC ............... *G01B 11/24* (2013.01); *B23Q 15/12* (2013.01); *G01B 11/005* (2013.01); *G01B 11/026* (2013.01)

(58) Field of Classification Search
None
See application file for complete search history.

(56) References Cited

U.S. PATENT DOCUMENTS

| | | | | |
|---|---|---|---|---|
| 3,606,798 A | * | 9/1971 | Leiter | A61B 6/4258 74/37 |
| 4,201,394 A | * | 5/1980 | Morawski | B23B 31/4033 242/573 |
| 4,252,380 A | * | 2/1981 | Sloyan | F16C 29/02 248/657 |
| 4,452,534 A | * | 6/1984 | Gribanov | G01B 11/2441 356/513 |
| 4,866,362 A | * | 9/1989 | Parker | B25J 19/022 700/259 |
| 5,251,156 A | * | 10/1993 | Heier | G01B 11/005 33/503 |

(Continued)

*Primary Examiner* — Michael A Lyons
*Assistant Examiner* — Jarreas C. Underwood
(74) *Attorney, Agent, or Firm* — R. Keith Harrison

(57) ABSTRACT

Apparatuses for measuring parameters of an object may include an apparatus frame. A rotary table assembly may include a rotary table having a diameter or width and carried by the apparatus frame. The rotary table may be configured to support the object for rotation. A rotary table motor may operably engage the rotary table for rotation. A carriage rail may be carried by the apparatus frame. The carriage rail may be disposed in fixed position relative to the rotary table. A sensor carriage may be carried by and configured to traverse the carriage rail. A carriage drive motor may engage the sensor carriage. The carriage drive motor may be operable to displace the sensor carriage along the carriage rail. At least one displacement sensor may be carried by the sensor carriage. The displacement sensor may have a displacement sensor travel path which passes over and traverses the diameter or width of the rotary table as the sensor carriage traverses the carriage rail. The displacement sensor may be configured to measure distances between the displacement sensor and surfaces on the object. Alternative embodiments of the apparatuses are also disclosed.

26 Claims, 17 Drawing Sheets

(56) References Cited

U.S. PATENT DOCUMENTS

| | | | | | |
|---|---|---|---|---|---|
| 5,511,007 | A | * | 4/1996 | Nihei | G01D 3/08 |
| | | | | | 700/193 |
| 5,568,264 | A | * | 10/1996 | Nakatsuka | H05K 13/0815 |
| | | | | | 356/394 |
| 5,875,559 | A | * | 3/1999 | Birang | G01B 5/285 |
| | | | | | 33/553 |
| 5,920,735 | A | * | 7/1999 | Gelphman | G03B 37/02 |
| | | | | | 396/24 |
| 6,301,009 | B1 | * | 10/2001 | Tinker | B24B 37/015 |
| | | | | | 356/519 |
| 6,556,783 | B1 | * | 4/2003 | Gelphman | H04N 5/232 |
| | | | | | 396/20 |
| 6,999,072 | B2 | * | 2/2006 | Imai | G06T 17/10 |
| | | | | | 382/154 |
| 7,583,391 | B2 | * | 9/2009 | Lu | G01B 11/25 |
| | | | | | 356/601 |
| 7,602,508 | B1 | * | 10/2009 | Peden | G01B 5/205 |
| | | | | | 356/600 |
| 7,684,057 | B2 | * | 3/2010 | Sakai | A61B 5/1075 |
| | | | | | 356/614 |
| 10,346,969 | B1 | * | 7/2019 | Raghu | G01N 21/8803 |
| 2002/0095807 | A1 | * | 7/2002 | Morgan | G01B 5/205 |
| | | | | | 33/530 |
| 2006/0045806 | A1 | * | 3/2006 | Winther | G01N 1/312 |
| | | | | | 422/68.1 |
| 2011/0128552 | A1 | * | 6/2011 | Hadcock | G01B 11/105 |
| | | | | | 356/496 |
| 2016/0279753 | A1 | * | 9/2016 | Sekiya | B24B 19/02 |
| 2018/0361729 | A1 | * | 12/2018 | Gibson | G01S 17/42 |
| 2019/0243338 | A1 | * | 8/2019 | Golway | B33Y 50/00 |
| 2020/0049495 | A1 | * | 2/2020 | Zhao | G01B 11/24 |
| 2020/0209163 | A1 | * | 7/2020 | O'Loughlin | G01N 21/95692 |

\* cited by examiner

APPARATUSES AND METHODS FOR MEASURING PARAMETERS OF AN OBJECT

CROSS-REFERENCE TO RELATED APPLICATIONS

This application claims the benefit of US provisional application No. 62/890,148, filed Aug. 22, 2019 and entitled APPARATUSES AND METHODS FOR MEASURING PARAMETERS OF AN OBJECT, which provisional application is hereby incorporated by reference herein in its entirety.

FIELD

Illustrative embodiments of the disclosure relate to marine propellers. More particularly, illustrative embodiments of the disclosure relate to apparatuses and methods which are suitable for measuring various parameters of an object such as pitch, rake and squareness of a marine propeller with accurate and repeatable results.

BACKGROUND

The background description provided herein is solely for the purpose of generally presenting the context of the illustrative embodiments of the disclosure. Aspects of the background description are neither expressly nor impliedly admitted as prior art against the claimed subject matter.

Traditionally, the pitch rake, squareness and other parameters of marine propellers has been measured by hand rotation, with hand-selected chords and points. In recent years, digital coordinate measurement machines have helped with accuracy, but the human factor remains a significant drawback, resulting in repeatability issues. This drawback is compounded on smaller props under 24 inches in diameter since the blade angles on such propellers may be much higher and the chord lengths, much shorter. Additionally, although it is common to have 3 decimal point readouts for such propellers, the actual repeatability and accuracy is typically not to a single decimal point of accuracy. An additional problem is that, due to mechanical slack and impact from right hand pressure vs. left hand pressure, etc., many of the manual machines which are used to effect measurement do not produce the same readings in the hands of different users. Moreover, smaller propellers are typically made from mirror-polished stainless steel. This type of highly reflective surface may cause lasers to fail to read the propeller properly. Lastly, the most accurate manual contact probe machines use a small contact point stylus, typically made from metal or stone. Such probe tips tend to scratch the propeller surface. This is particularly problematic on final inspection of a completed propeller. Non-contact sensors mitigate this problem.

Accordingly, apparatuses and methods which are suitable for measuring various parameters of an object such as pitch, rake and squareness of a marine propeller with accurate and repeatable results are needed.

SUMMARY

Illustrative embodiments of the disclosure are generally directed to apparatuses for measuring parameters of an object. An illustrative embodiment of the apparatuses may include an apparatus frame. A rotary table assembly may include a rotary table having a diameter or width and carried by the apparatus frame. The rotary table may be configured to support the object for rotation. A rotary table motor may operably engage the rotary table for rotation. A carriage rail may be carried by the apparatus frame. The carriage rail may be disposed in fixed position relative to the rotary table. A sensor carriage may be carried by and configured to traverse the carriage rail. A carriage drive motor may engage the sensor carriage. The carriage drive motor may be operable to displace the sensor carriage along the carriage rail. At least one displacement sensor may be carried by the sensor carriage. The displacement sensor may have a displacement sensor travel path which passes over and traverses the diameter or width of the rotary table as the sensor carriage traverses the carriage rail. The displacement sensor may be configured to measure distances between the displacement sensor and surfaces on the object.

In some embodiments, the apparatus may include an apparatus frame. A rotary table assembly may include a rotary table carried by the apparatus frame. The rotary table may be configured to support the object for rotation. A rotary table motor may operably engage the rotary table for rotation. The apparatus may include at least one robotic sensor positioning arm. At least one displacement sensor may be carried by the at least one robotic sensor positioning arm. The at least one robotic sensor positioning arm may be configured for movement or positioning of the at least one displacement sensor along a plurality of axes. The at least one displacement sensor may be configured to measure distances between the at least one displacement sensor and surfaces on the object.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
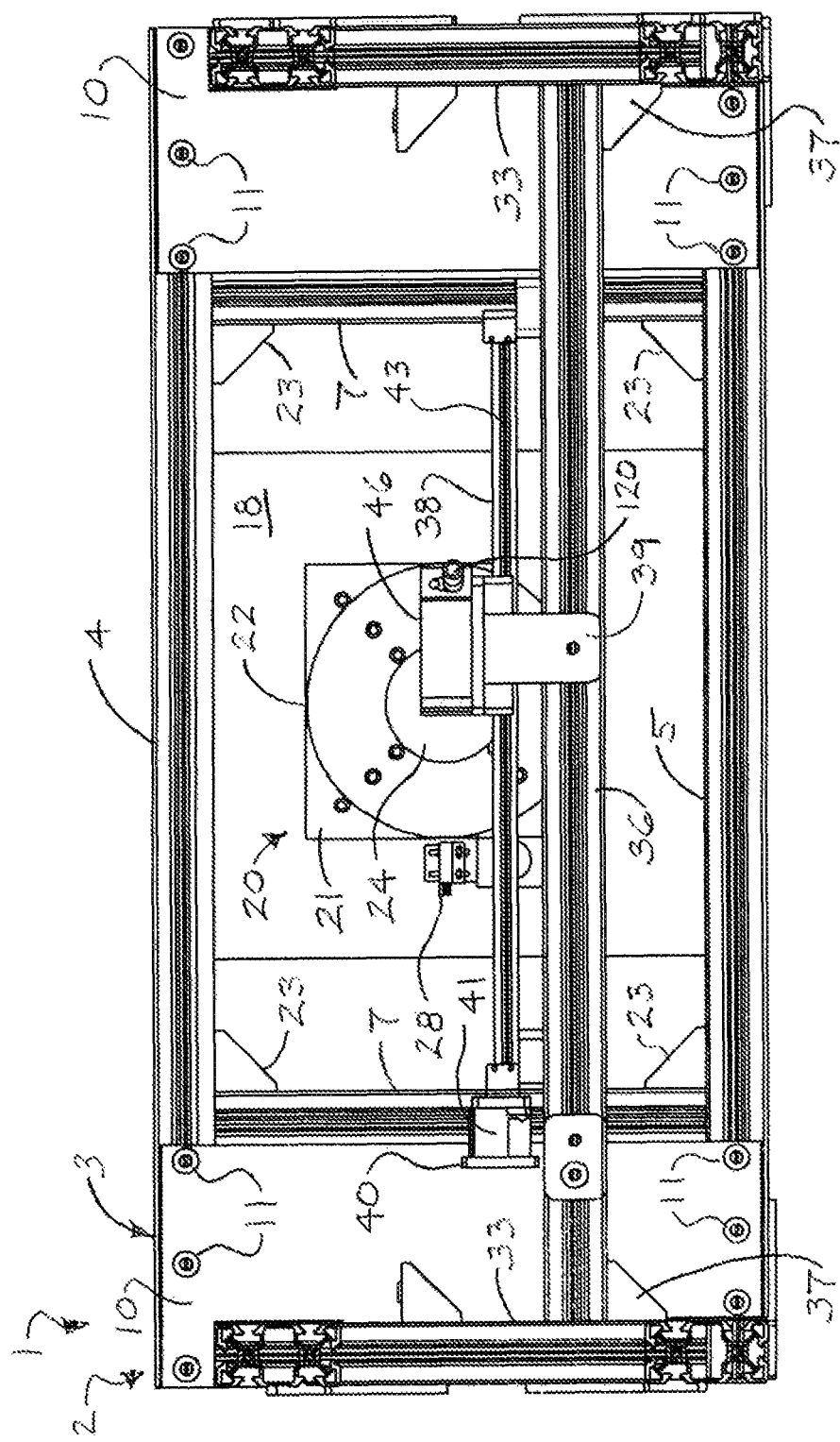
FIG. 1 is a top view of an illustrative embodiment of the apparatuses for measuring parameters of an object.
Figure 2:
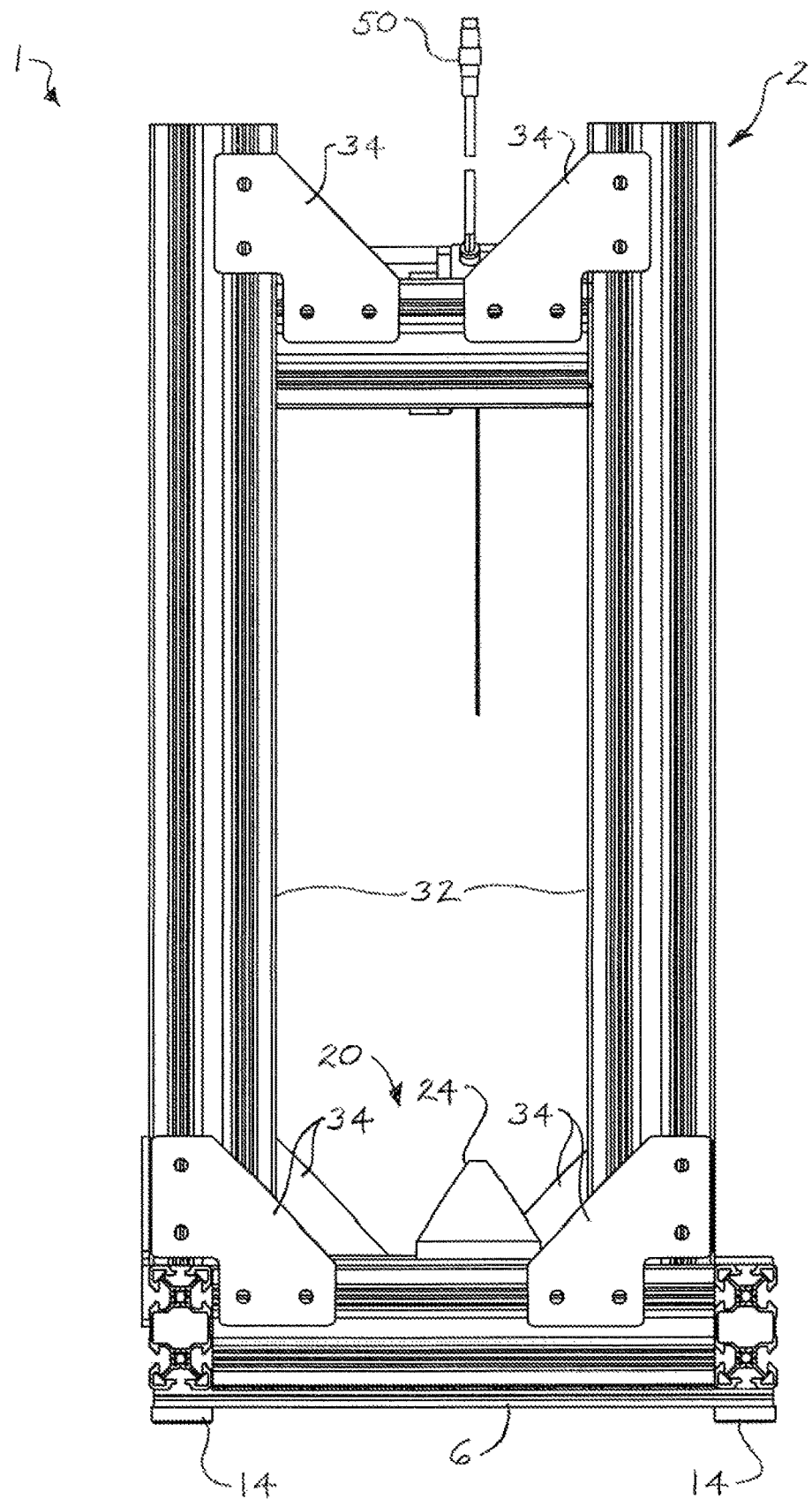
FIG. 2 is a side view of the illustrative apparatus.
Figure 3:
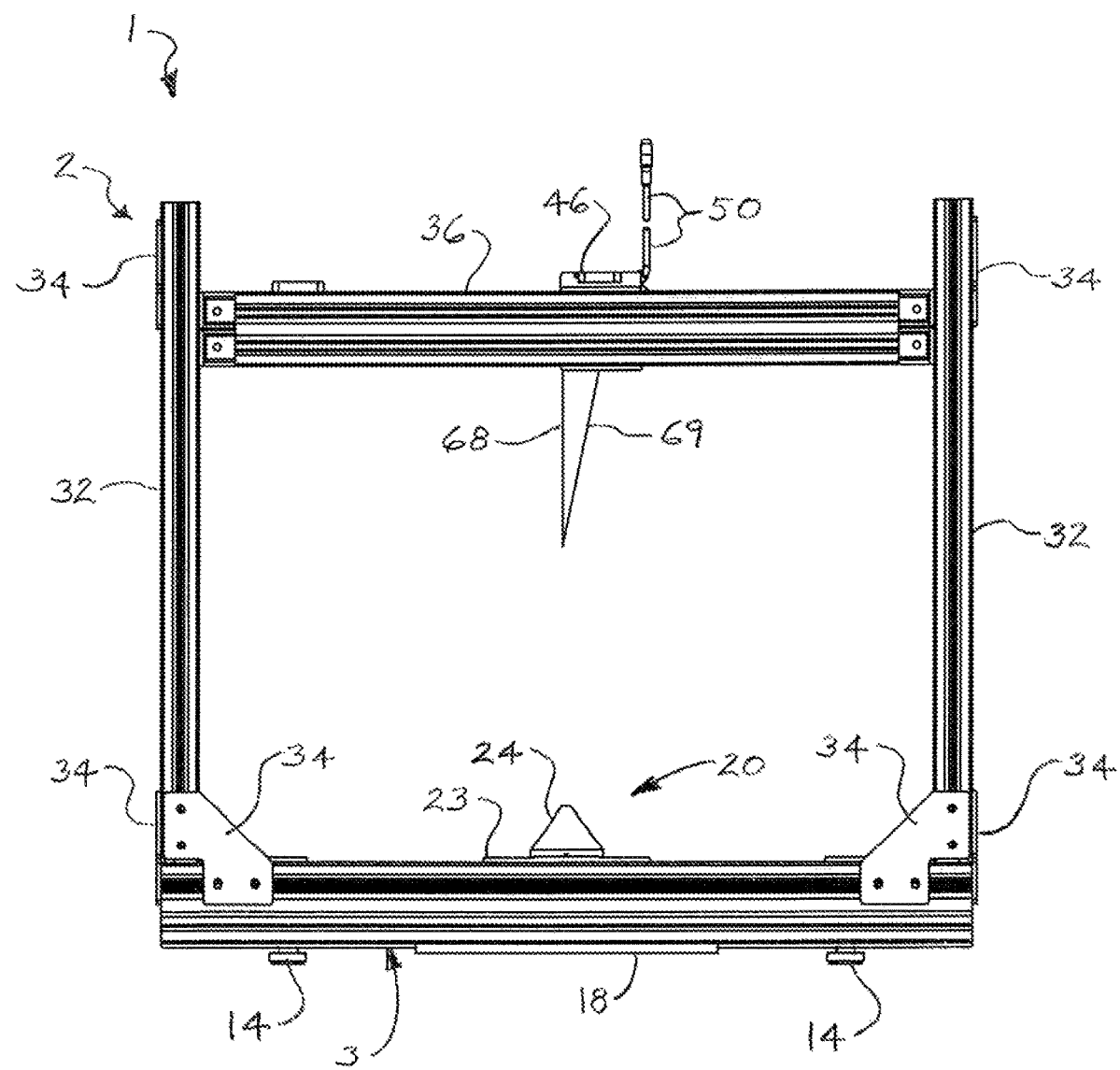
FIG. 3 is a rear view of the illustrative apparatus.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper". "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the drawings, an illustrative embodiment of the apparatus for measuring various parameters of an object with accurate and repeatable results is generally indicated by reference numeral 1. In some applications, the apparatus 1 may be used to measure various parameters of a marine propeller. In other applications, the apparatus 1 may be used to measure various parameters of aircraft propellers or other objects in various industries. As illustrated in FIGS. 6-12, in typical application, which will be hereinafter described, the apparatus 1 may be suitable for scanning a marine propeller 54 and measuring various parameters such as pitch, rake and squareness of the propeller 54 with accurate and repeatable results. In some applications, a damaged propeller 54 may be periodically measured during repair to the propeller 54. The measured parameters may be used to quantify variation from a casting to the desired finished dimensions, or damage to and facilitate repair of the propeller 54, for example and without limitation. The propeller 54 may include a propeller hub 55. Each of multiple propeller blades 56 may extend from the propeller hub 55 at a corresponding blade root 60. Each propeller blade 56 may have a blade face 57 and a blade back 62 which may be bound by a leading blade edge 58, a trailing blade edge 59 and a blade tip 61. A cup zone 63 may extend along a distal or outer portion of the trailing blade edge 59 toward the blade tip 61 of each propeller blade 56.

As illustrated in FIGS. 1-6, the apparatus 1 may include an apparatus frame 2. The apparatus frame 2 may include a frame base 3. In some embodiments, the frame base 3 may be elongated and rectangular with a front base member 4, a rear base member 5 and a pair of spaced-apart, parallel outside base members 6 extending between the front base member 4 and the rear base member 5. A pair of spaced-apart, parallel inside base members 7 may extend between the front base member 4 and the rear base member 5 between and in parallel, spaced-apart relationship to the outside base members 6. Reinforcing gussets 23 may extend between each inside base member 7 and the corresponding front base member 4 and rear base member 5.

A pair of spaced-apart base member connector plates 10 may extend between the front base member 4 and the rear base member 5 at the respective outside base members 6 and inside base members 7 of the frame base 3. The base member connector plates 10 may be attached to the front base member 4 and the rear base member 5 via suitable fasteners 11, welding and/or other suitable attachment technique. As illustrated in FIGS. 2-5, base feet 14 may be provided on the lower surface of the frame base 3. The base feet 14 may be configured to support the apparatus 1 on a desktop, table-top or other flat support surface (not illustrated).

Figure 4:
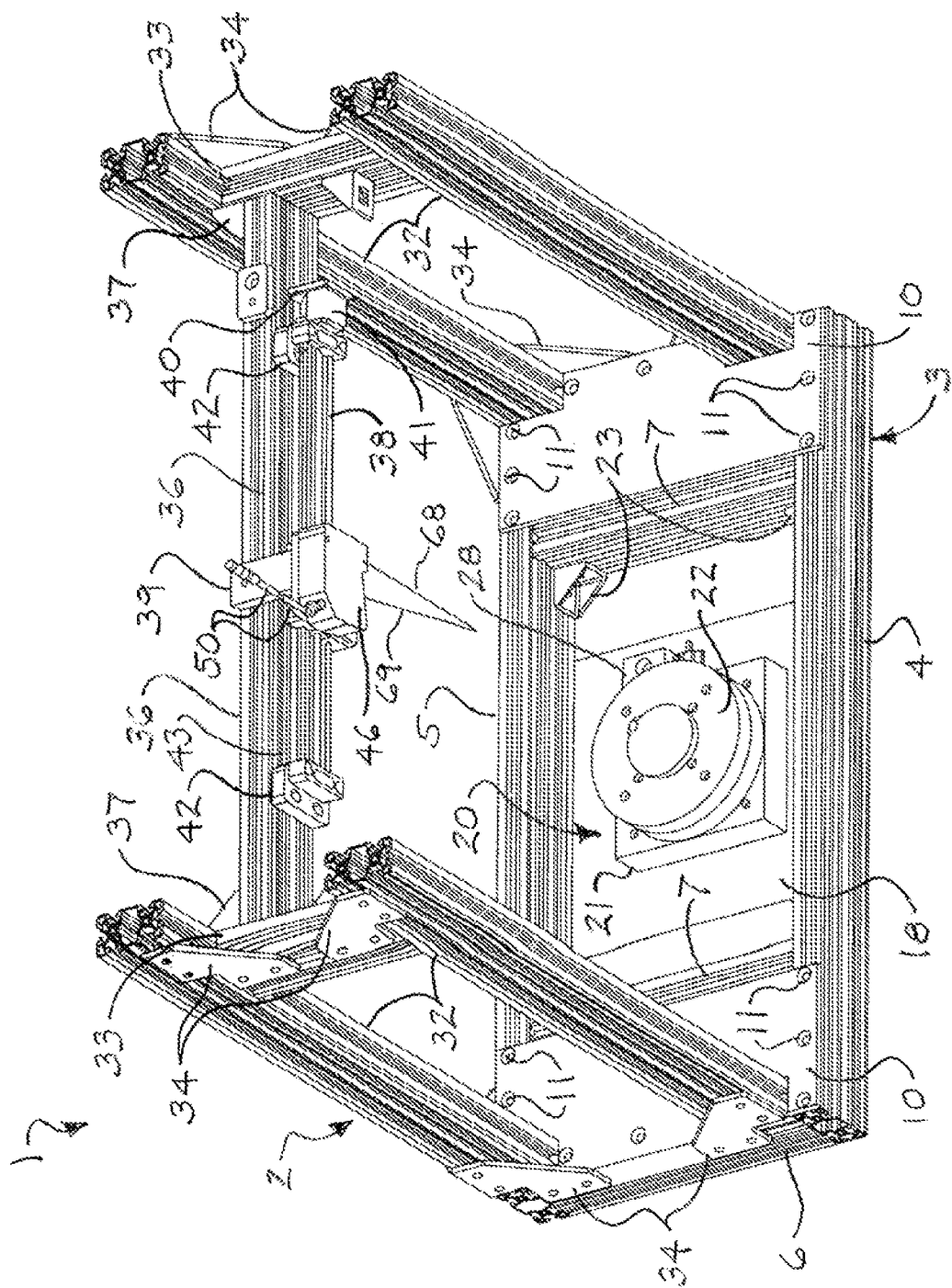
FIG. 4 is a top front right side perspective view of the illustrative apparatus.
Figure 5:
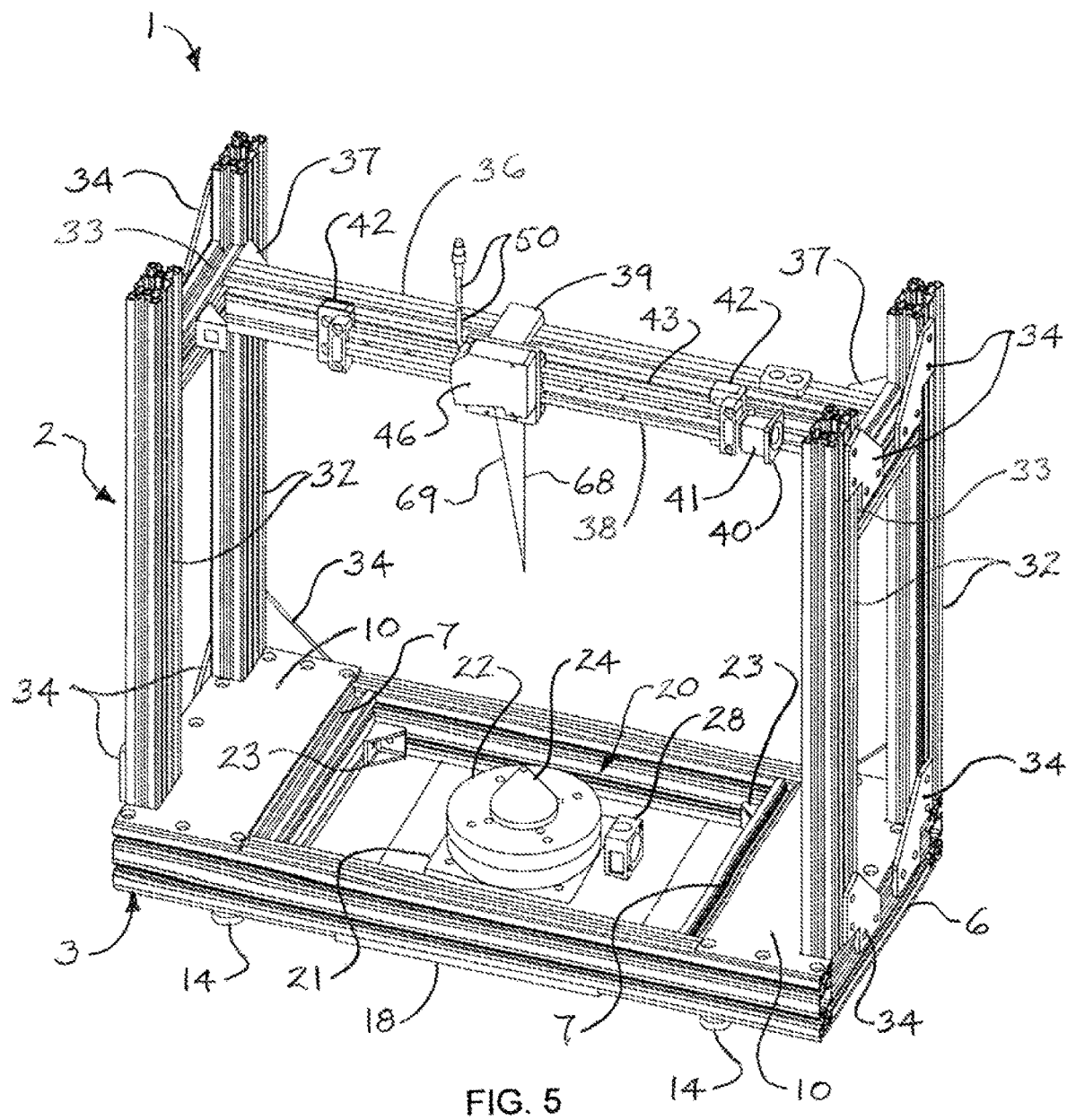
FIG. 5 is a top front left side perspective view of the apparatus.
Figure 6:
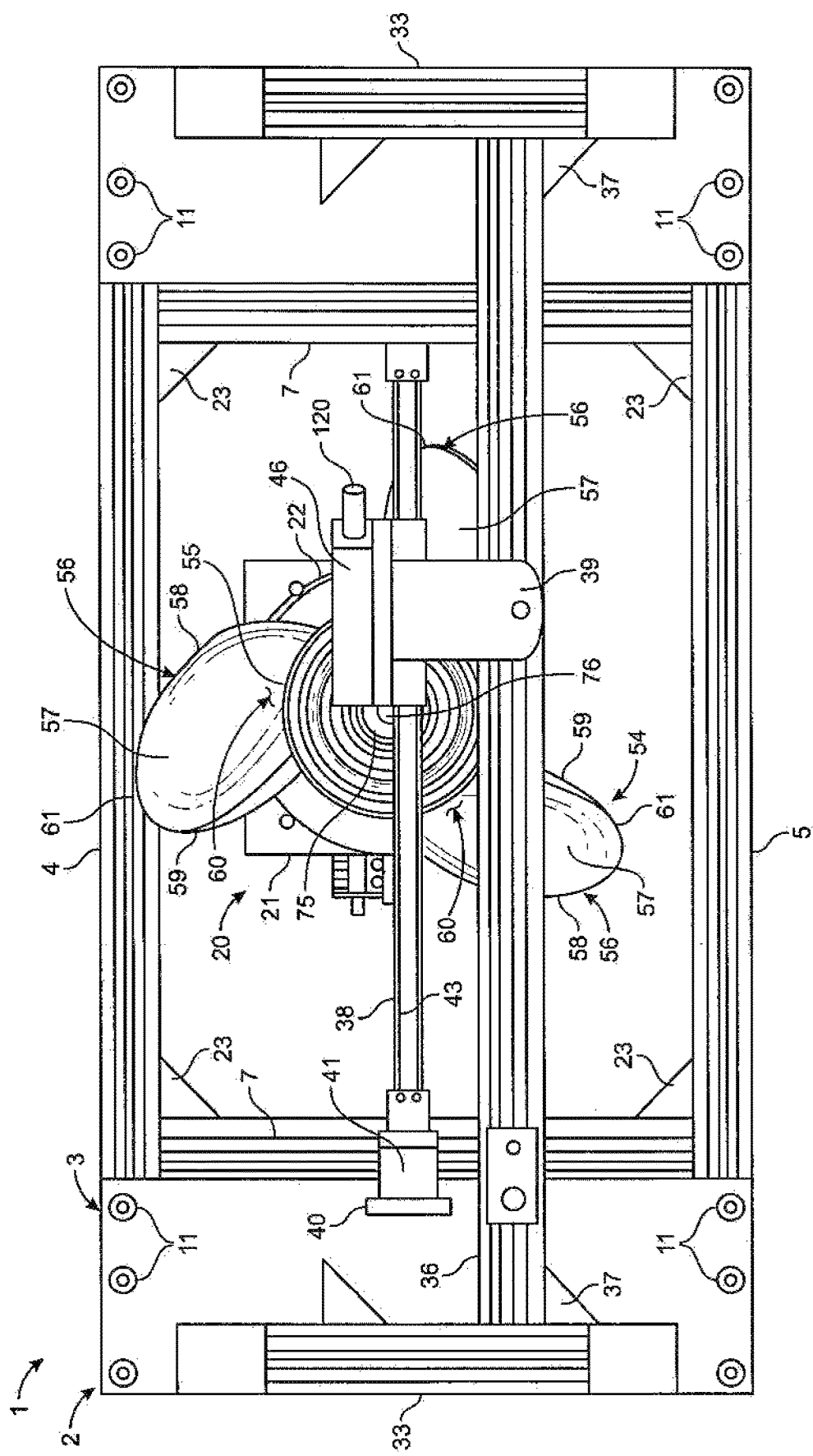
FIG. 6 is a top view of the illustrative apparatus in measurement of the parameters of a marine propeller according to typical application of the apparatus.
Figure 7:
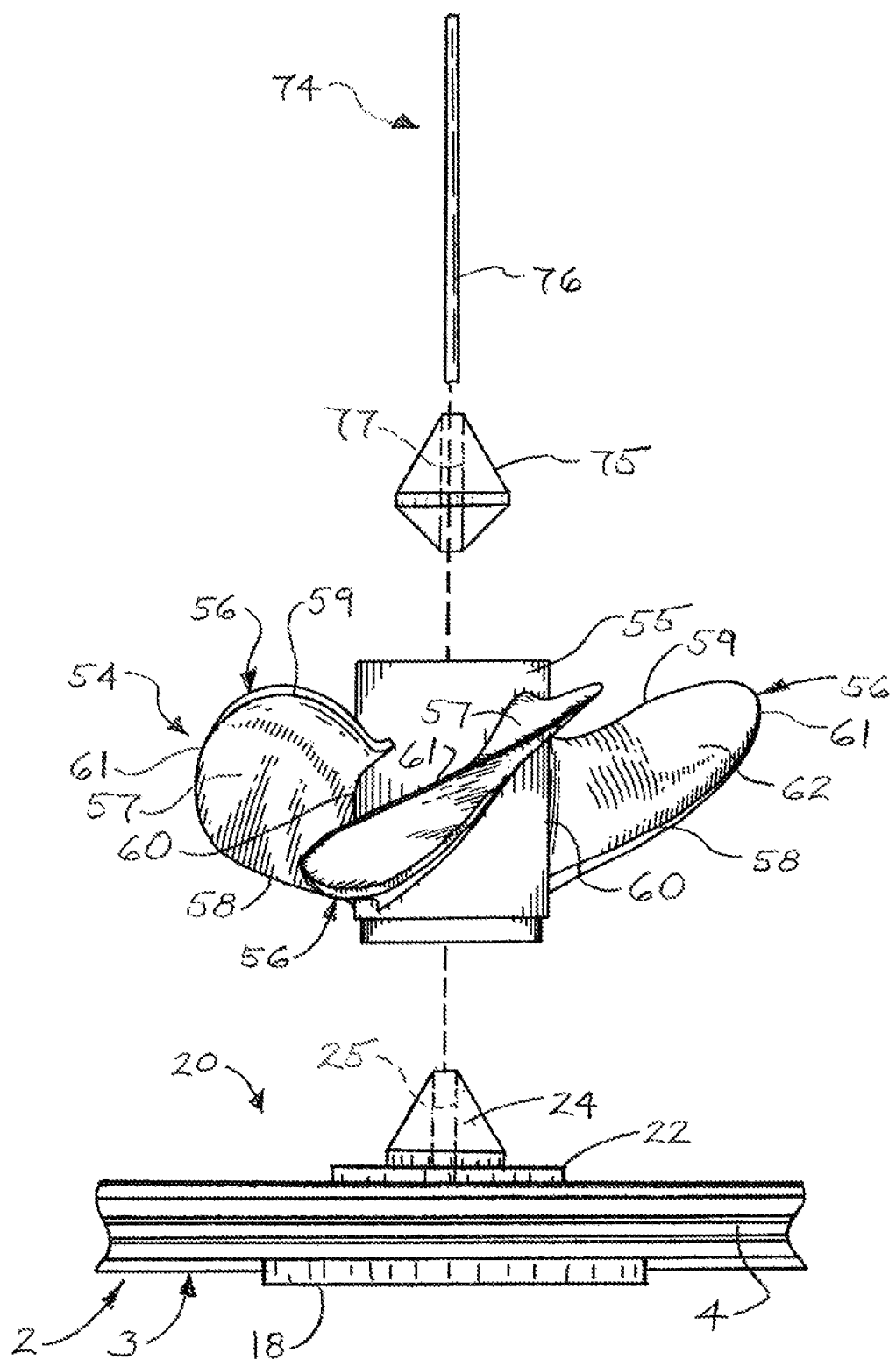
FIG. 7 is an exploded front perspective view of a typical collet assembly in stabilizing a marine propeller on a rotary table of the apparatus preparatory to measuring the parameters of the propeller.

A rotary table assembly 20 may be provided on the frame base 3 of the apparatus frame 2. As illustrated in FIGS. 4 and 5, in some embodiments, the rotary table 20 may be provided on a rotary table support plate 18 on the frame base 3. The rotary table support plate 18 may be recessed between the inside base members 7. A rotary table base 21 may extend from the rotary table support plate 18. A rotary table 22 may be mounted for rotation with respect to the rotary table base 21 according to the knowledge of those skilled in the art. A central rotary table cone 24 may extend from the rotary table 22. In typical application of the apparatus 1, which will be hereinafter described, the rotary table cone 24 may be configured to insert into the propeller hub 55 of the propeller 54 to stabilize the propeller 54 on the rotary table 22 during scanning and measurement of the propeller 54. As illustrated in FIG. 7, in some embodiments, the rotary table cone 24 may have a rotary table cone opening 25 the purpose of which will be hereinafter described.

A rotary table motor 28 may operably engage the rotary table 22 to facilitate selective 360-degree rotation of the rotary table 22. In some embodiments, the rotary table motor 28 may be a servo-controlled motor which is capable of high accuracy transmission of its position within 360 degrees of rotation to a processor 81 (FIG. 13) in a control system 80, for purposes which will be hereinafter described.

As illustrated in FIGS. 6-10, the rotary table 22 of the rotary table assembly 20 may be configured to support the propeller 54 to facilitate selective rotational positioning of the propeller 54 in scanning and measurement of the propeller parameters, typically as will be hereinafter described. As illustrated in FIG. 7, in some embodiments, a collet assembly 74 may immobilize and stabilize the propeller 54 on the rotary table 22. The collet assembly 74 may include a tapered collet cone 75 which may seat in the propeller hub 55 of the propeller 54. An elongated collet shaft 76 may extend through a central cone opening 77 in the collet cone 75 and through the propeller hub 55 and the registering rotary table cone opening 25 in the rotary table cone 24 on the rotary table 22.

At least one slide rail support 32 may extend upwardly from the frame base 3 of the apparatus 2. In some embodiments, multiple, spaced-apart slide rail supports 32 may extend upwardly from the frame base 3 typically at respective corners of the frame base 3. A slide rail support connector 33 may extend between the parallel, spaced-apart slide rail supports 32 on each side of the frame base 3. Reinforcing gussets 34 may extend between each slide rail support 32 and corresponding outside base member 6 and each slide rail support 32 and corresponding slide rail support connector 33.

An elongated, horizontal slide rail 36 may be supported by the slide rail support or supports 32. In some embodiments, the slide rail 36 may extend between the slide rail support connectors 33. Attachment brackets 37 may attach the slide rail 36 to each corresponding slide rail support connector 33. An elongated, horizontal carriage rail 38 may be supported by the slide rail 36 in parallel, spaced-apart relationship thereto. The carriage rail 38 may be mounted in fixed position relative to the rotary table 22 of the rotary table assembly 20. In some embodiments, the carriage rail 38 may be attached to the slide rail 36 via at least one carriage rail mount bracket 42, for example and without limitation.

A sensor carriage 39 may adjustably engage the carriage rail 38 according to the knowledge of those skilled in the art. The sensor carriage 39 may be configured to traverse at least a portion of the length of the carriage rail 38 responsive to application of an axial force to the sensor carriage 39, typically as will be hereinafter described.

A carriage drive motor 41 may operably engage the sensor carriage 39 for axial movement of the sensor carriage 39 along the carriage rail 38. The carriage drive motor 41 may include a precision-control servo motor. In some embodiments, the carriage drive motor 41 may drivingly engage a carriage drive lead screw 43 for rotation. The carriage drive lead screw 43 may threadably engage the sensor carriage 39. Accordingly, by operation of the carriage drive motor 41, the carriage drive lead screw 43 may facilitate selective axial travel of the sensor carriage 39 along the carriage rail 38. The carriage drive motor 41 may be mounted in a motor mount 40 which may extend from the slide rail 36 at one end of the carriage rail 38.

Figure 8:
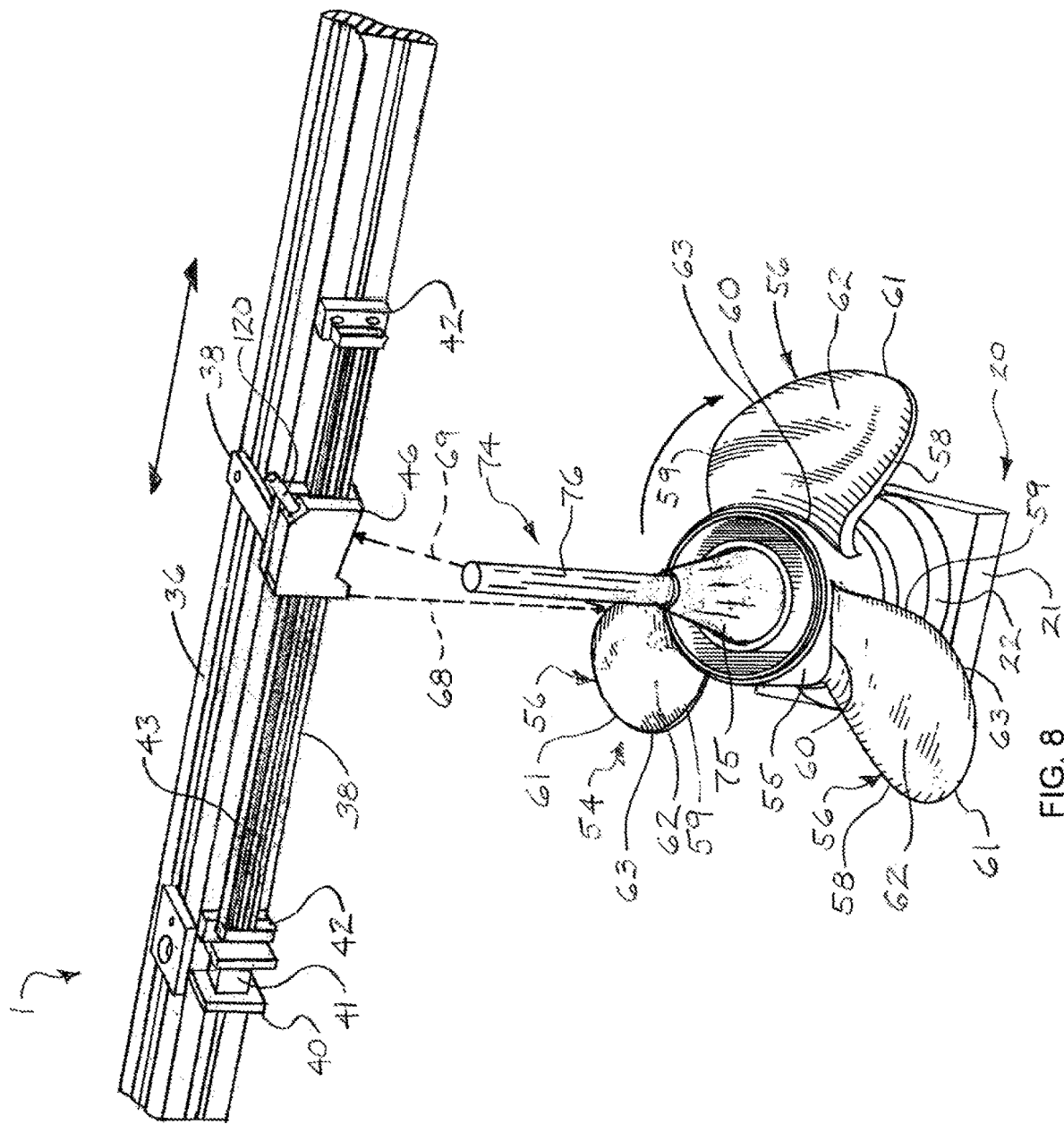
FIG. 8 is front perspective view of a portion of the illustrative apparatus, more particularly illustrating impingement of an incident laser beam from a displacement sensor on the apparatus against a propeller blade of the propeller and reflection of a reflected laser beam from the propeller blade to the displacement sensor in typical measurement of the parameters of the marine propeller.
Figure 9:
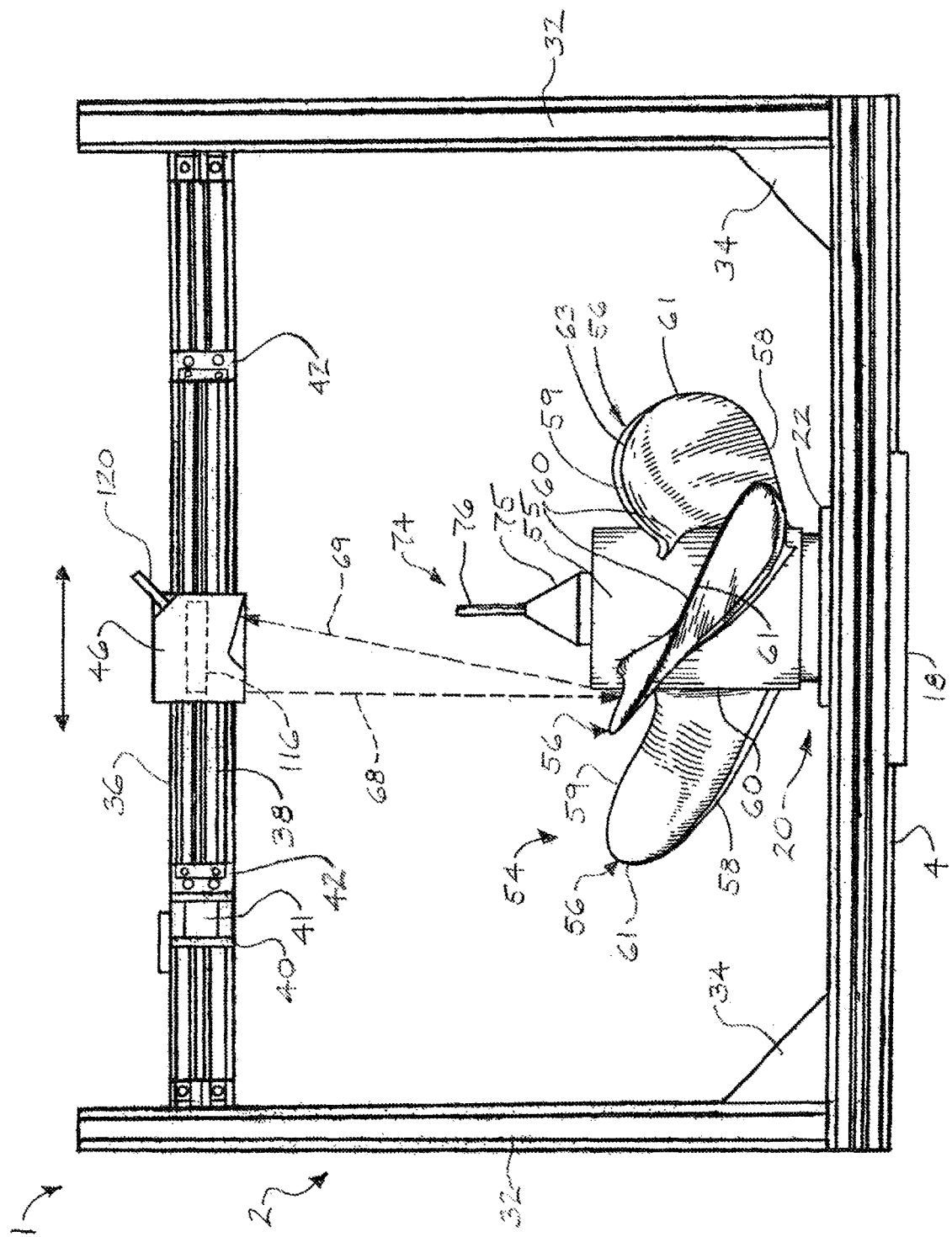
FIG. 9 is a front view of the apparatus in typical application of the apparatus.
Figure 10:
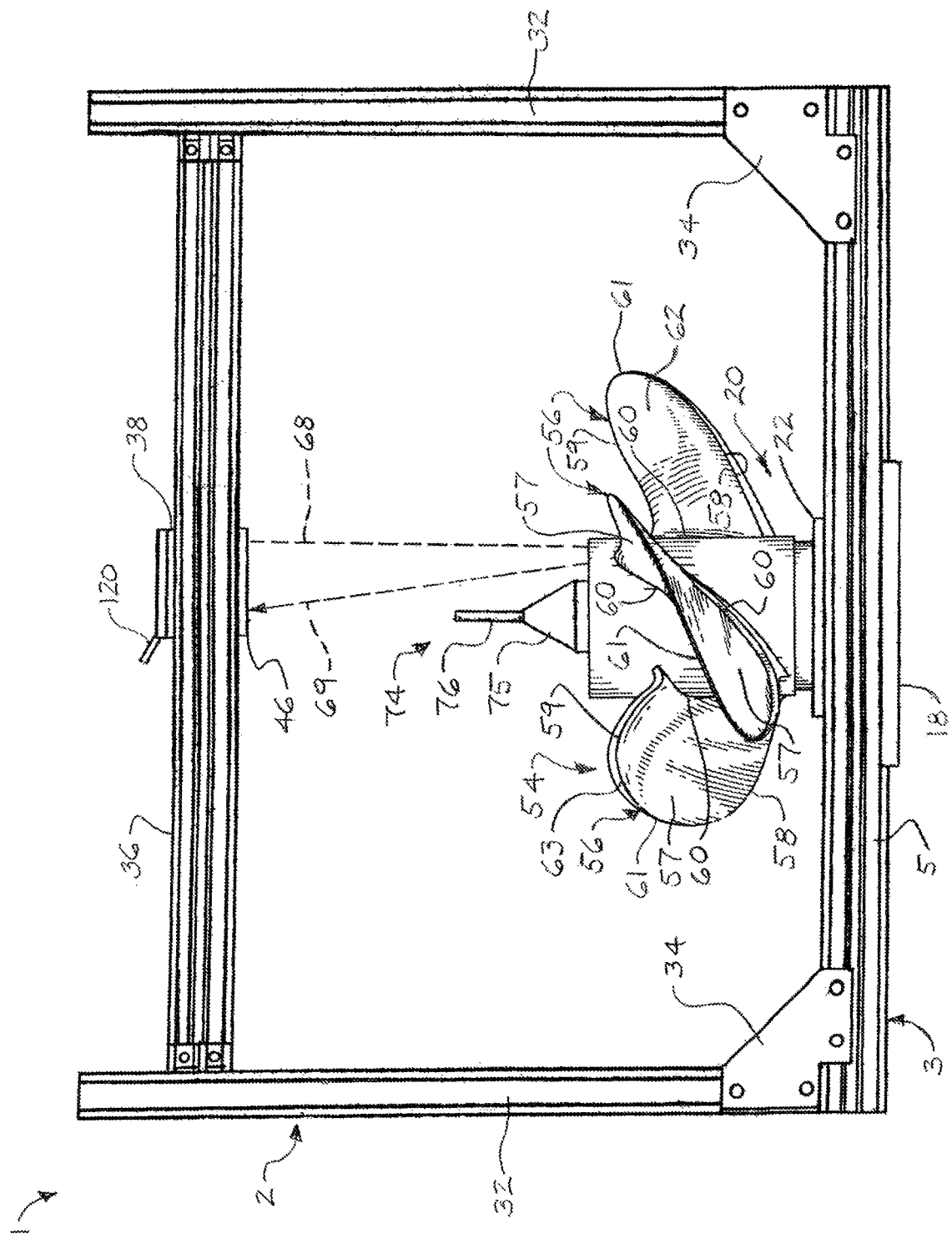
FIG. 10 is a rear view of the apparatus in typical application of the apparatus.
Figure 13:
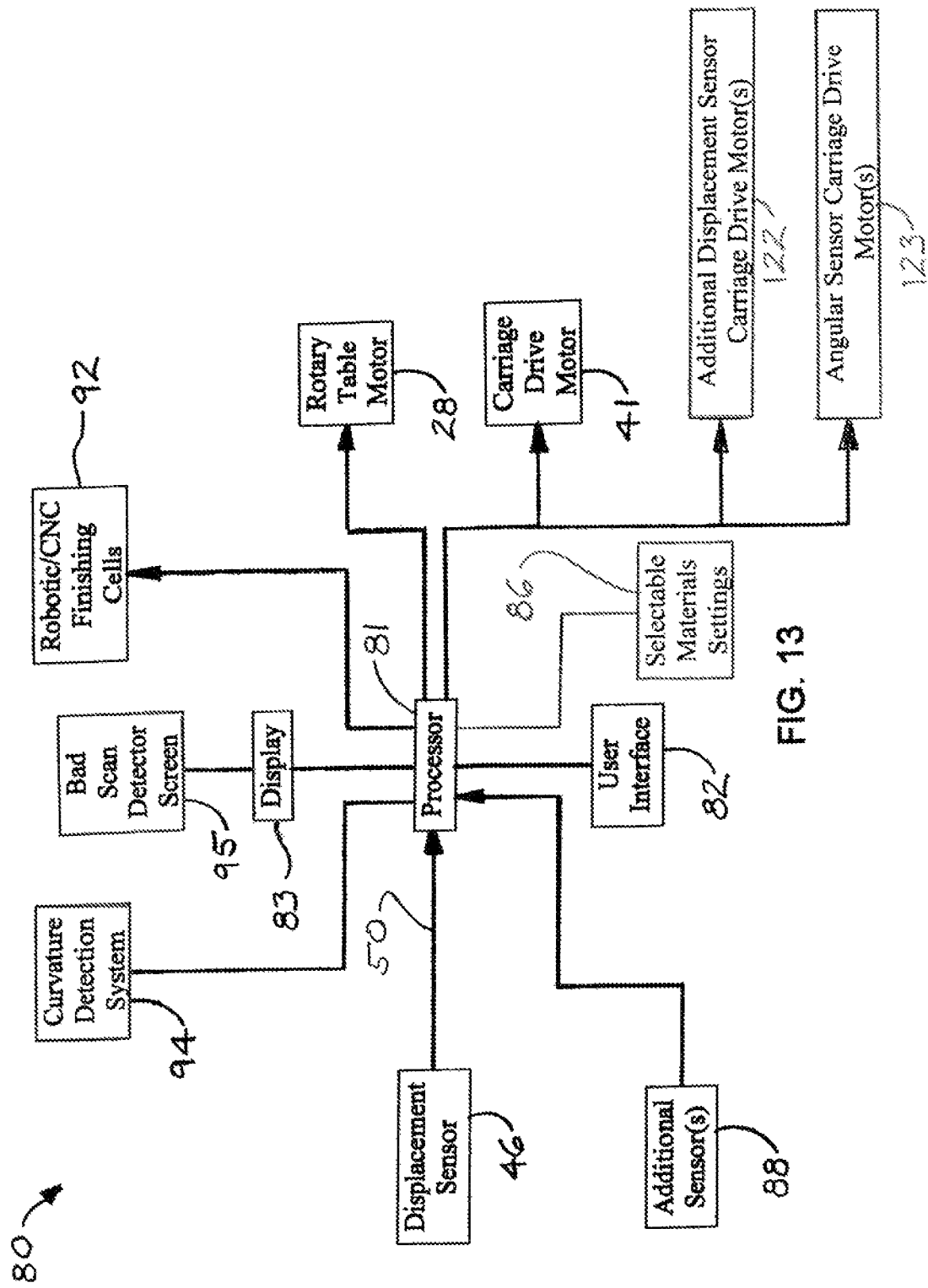
FIG. 13 is a block diagram illustrating a typical control system suitable for the apparatus.

A displacement sensor 46 may be provided on the sensor carriage 39. The displacement sensor 46 may operate according to the triangulation principle. Accordingly, as illustrated in FIGS. 8-10, in some embodiments, the displacement sensor 46 may be configured to emit an incident laser beam 68 through an optical receiving system against and receive a reflected laser beam 69 from the propeller 54 onto a positive sensitive element (CCD) array. The target point or position on the propeller 54 may be evaluated. If the target point changes its distance to the displacement sensor 46, this may result in a change of the imaging spot on the CCD array. The displacement sensor 46 may take multiple samples at respective target points in a 360-degree rotation of the propeller 54 on the rotary table 22 of the rotary assembly 20. In the foregoing manner, the displacement sensor 46 may determine the distances between the displacement sensor 46 and the target points on the propeller 54. The displacement sensor 46 may transmit an analog signal which is proportional to the measured distance to the processor 81 of the control system 80 (FIG. 13). The processor 81 may use the resulting distance measurement data with the rotational position of the rotary table 22 and the linear or axial position of the displacement sensor 46 along the carriage rail 38 to determine the pitch, rake, squareness and/or other parameters of the propeller 54. In other embodiments, the displacement sensor 46 may utilize at least one high-resolution camera (not illustrated) to obtain images of the surfaces on the propeller 54 and perform the distance measurements.

Figure 11:
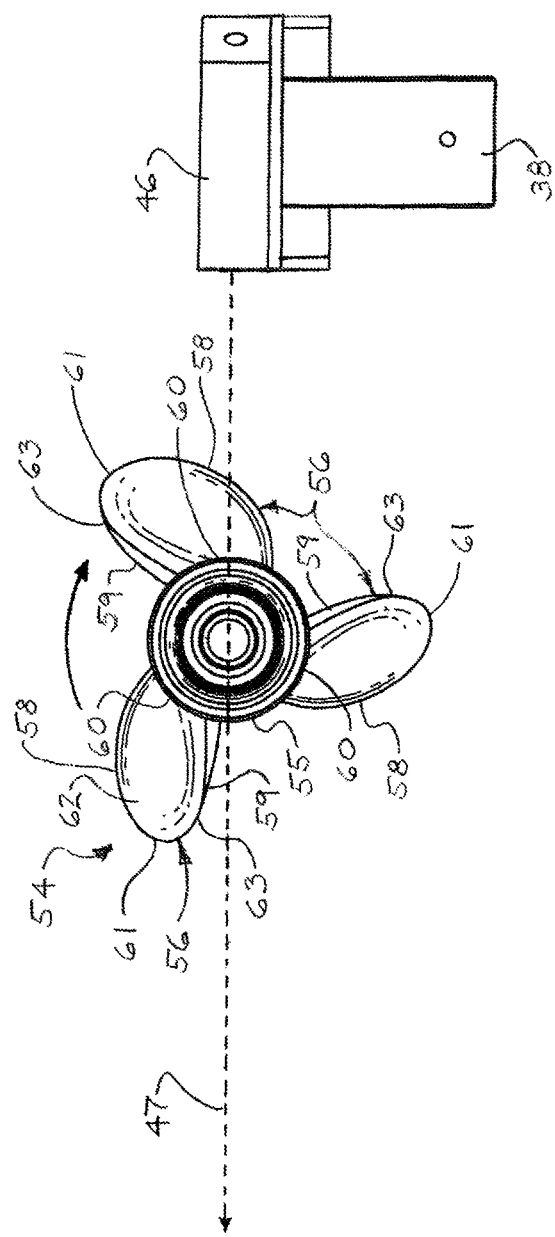
FIG. 11 is a top view illustrating a typical displacement sensor travel path of the displacement sensor across the diameter of the marine propeller with simultaneous rotation of the propeller on the rotary table in typical application of the apparatus.
Figure 12:
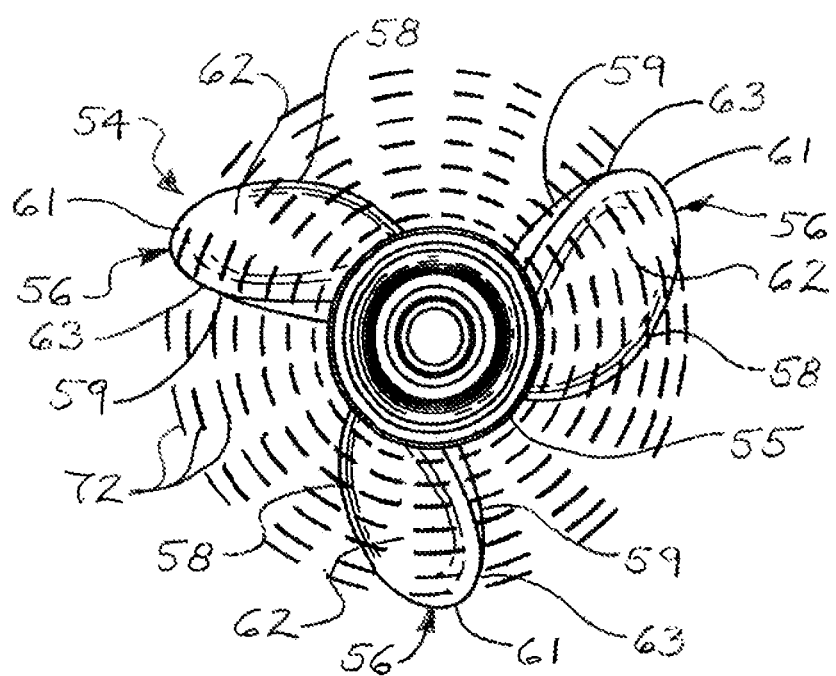
FIG. 12 is a top view of the marine propeller illustrating multiple radius lines measured in typical implementation of the apparatus.

As illustrated in FIG. 1, the carriage rail 38 may be positioned such that the displacement sensor 46 is positional over substantially the center of the rotary table 22 as the displacement sensor 46 traverses the carriage rail 38. Accordingly, as illustrated in FIG. 11, the displacement sensor 46 may have a displacement sensor travel path 47 which may pass over substantially the diameter or width of the rotary table 22 (FIG. 6) or the center of the propeller hub 55 as it traverses from one end to the other end of the carriage rail 38. The displacement sensor travel path 47 may exceed the entire diameter of the propeller 54 such that the incident laser beam 68 which is emitted by the displacement sensor 46 is capable of impinging on every portion on the surface of the propeller 54. Thus, as illustrated in FIG. 12, the longitudinal, linear or axial position of the displacement sensor 46 on the carriage rail 38, in combination with the distance measurement data from the displacement sensor 46 and the rotating motion of the rotary table 22 of the rotary table assembly 20, may facilitate measurement of multiple radius lines 72 on the propeller blades 56 of the propeller 54 to determine the pitch and/or other desired parameters of the propeller 54.

In some embodiments, the slide rail 36 and/or the carriage rail 38 may be supported by the slide rail support or supports 32 in a cantilevered configuration. In other embodiments, the apparatus 1 may be fabricated of a rigid CMM type "box" construction, as illustrated, in which the slide rail 36 may be supported between the slide rail supports 32. A cantilever beam construction may tend to warp over time and may be more subject to handling damage during shipping, setup, and in daily use. A cantilever beam system in which the beam rotates about a fixed propeller will suffer accuracy losses due to the very small stabilizing contact area for the beam system, as well as pressure from weight loads of the sensors on the beams. An electronically powered cantilever beam rotating about a fixed prop is also much more vulnerable to damage as there is no protection for the delicate equipment. Also, the exposed cabling which is continually flexed as the beam rotates about the prop may result in much shorter service life than a box construction for the apparatus 1. Nevertheless, the present disclosure contemplates embodiments in which a cantilever configuration is utilized.

Figure 15:
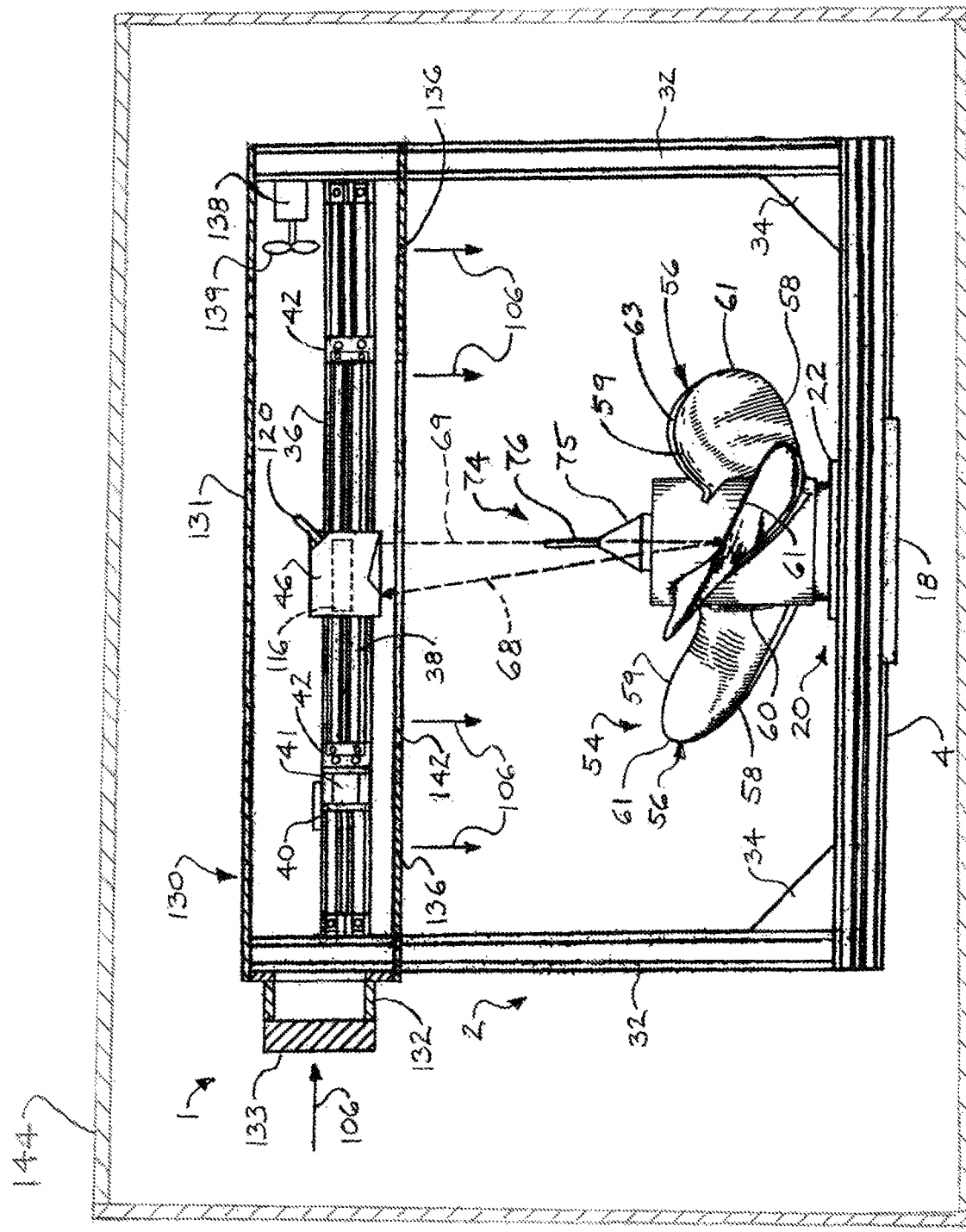
FIG. 15 is a sectional view of a typical air filtration system extending over the displacement sensor, the carriage drive motor and the carriage drive lead screw according to some embodiments of the apparatus.

As illustrated in FIGS. 9 and 15, in some embodiments, the displacement sensor 46 may include at least one laser mirror system 116. The laser mirror system 116 may be configured to emit an incident laser beam 68 and receive a reflected laser beam 69 to measure distances between the displacement sensor 46 and the respective surfaces on the propeller 54, typically for purposes which will be hereinafter described. In other embodiments, the displacement sensor 46 may include at least one high-resolution camera (not illustrated) to effect the distance measurements.

As illustrated in FIG. 15, in some embodiments of the apparatus 1, the carriage drive motor 41, the carriage drive lead screw 43 and the displacement sensor 46 may be contained inside an air filtration system 130. The air filtration system 130 may prevent dust and abrasive particles from impacting the laser mirror system 116 of the displacement sensor 46 in operation of the apparatus 1 in dirty industrial environments. Accordingly, the air filtration system 130 may include an air filtration housing 131 provided on the apparatus frame 2. In some embodiments, the air filtration housing 131 may be elongated and may extend between a pair of the slide rail supports 32 of the apparatus frame 2. The slide rail 36, carriage rail 38, carriage drive motor 41, carriage drive lead screw 43 and displacement sensor 46 may be contained inside the air filtration housing 131. At least one cooling fan 139, drivingly engaged by a fan motor 138, may be provided in the air filtration housing 131.

An air intake portion 132 may extend from the air filtration housing 131. At least one air filter 133 may be provided in the air intake portion 132. As the cooling fan 139 draws air 106 into the air filter housing 131, the air 106 may flow through the air filter 133. The filtered air 106 may exit the air filtration housing 131 through at least one air opening 136 in the filter housing 131.

At least one laser slot 142 may extend through the wall of the air filtration housing 131. The laser slot 142 may have a minimum size and may be coextensive with the travel path of the displacement sensor 46 on the carriage rail 38. Accordingly, the incident laser beam 68 emitted by the laser mirror system 116 may exit the filtration housing 131 and the reflected laser beam 69 reflected from the propeller 54 may enter the displacement sensor 46 through the laser slot 142. Filtered air may flow from the air filter housing 131 through the laser slot 142.

A cable connector 120 may extend from the displacement sensor 46 to facilitate passage of a sensor cable 50 from the laser mirror system 116 to the processor 81 (FIG. 13) of the control system 80.

As illustrated in FIG. 13, a typical control system 80 for the apparatus 1 may include a processor 81. The processor 81 may include at least one desktop computer, laptop computer, tablet, smartphone, and/or any other type of device or system which is capable of carrying out the computations necessary for determining the desired propeller parameter(s) of the propeller 54. At least one user interface 82 may communicate with the processor 81 through a wired or wireless connection. The user interface 82 may include at least one keyboard, touch screen, one or more devices which may enable a user to program and/or control operation of the apparatus 1. At least one display 83 may interface with the processor 81. The display 83 may include readouts or screen shots which display the data relating to the parameters of the propeller 54 which are selected for measurement. In some embodiments, the display 83 may include a bad scan detector screen 95, or alternatively, the bad scan detector screen 95 may independently interface with the processor 81 for purposes which will be hereinafter described.

The displacement sensor 46 may interface with the processor 81. The displacement sensor 46 may be configured to transmit distance measurement input to the processor 81 which may be in the form of an analog signal corresponding to the distance from the displacement sensor 46 to the various target points, or points of impingement, of the incident laser beam 68 on the propeller blades 56 of the propeller 54. Using the distance measurement input from the displacement sensor 46 typically with the rotational position of the rotary table 22 and the linear position of the displacement sensor 46, the processor 81 may be programmed to calculate the pitch, rake, squareness and/or other parameters of the propeller 54 using calculation methods known by those skilled in the art. The processor 81 may controllably interface with rotary table motor 28 of the rotary table assembly 20 and the carriage drive motor 41. The interface may include feedback sensors, encoders and/or other components which indicate the 360-degree position of the rotary table 22 and the longitudinal, linear or axial position of the sensor carriage 39 and displacement sensor 46 along the carriage rail 38 to the processor 81.

As further illustrated in FIG. 13, in some embodiments, at least one robotic/CNC finishing cell 92 may interface with the processor 81. The robotic/CNC cells 92 may receive input from the processor 81 for purposes which will be hereinafter described. At least one curvature detection system 94 may interface with the processor 81 for purposes which will be hereinafter described. As further illustrated in FIG. 13, in some embodiments, at least one additional sensor 88 may interface with the processor 81 for purposes which will be hereinafter described.

As further illustrated in FIG. 13, in some embodiments, at least one additional displacement sensor carriage drive motor 122 and/or at least one angular displacement sensor carriage drive motor 123 may interface with the processor 81 for purposes which will be hereinafter described. As illustrated in FIG. 15, in some embodiments, the apparatus 1 may be substantially enclosed within a housing or enclosure 144 fabricated of opaque or semi-transparent materials, such as those used in welding screens, to protect observers from reflected laser beams. Additionally, the housing or enclosure may reduce the effect of ambient or other industrial light on the effectiveness of laser-operated displacement sensors.

As further illustrated in FIG. 13, in some embodiments, the user interface 82 may include at least one selectable material setting 86. The selectable material setting 86 may provide a user of the apparatus 1 with custom settings for the incident laser beam 68 emitted by the laser mirror system 116 (FIG. 15), the air filtration system 130, the speed of rotation of the rotary table 22 of the rotary table assembly 20, the carriage drive motor 41 and/or other operational aspects and components of the apparatus 1 to adapt for the differences in surface texture, color and materials of the propeller 54 or other object or objects being measured.

Referring next to FIGS. 6-15 of the drawings, in typical application of the apparatus 1, one or more parameters of a raw cast propeller or damaged marine propeller 54 may be periodically measured during manufacturing or repair of the propeller 54 to quantify out of specification area or damage to and facilitate repair of the propeller 54. Accordingly, the base feet 14 (FIGS. 2, 3 and 5) on the frame base 3 of the apparatus frame 2 may be placed on a desktop, table-top or other support surface (not illustrated). The propeller 54 the parameter(s) of which is/are to be measured may then be deployed in place on the rotary table 22 of the rotary table assembly 20. Accordingly, as illustrated in FIG. 7, the propeller 54 may be oriented such that the blade face 57 of each propeller blade 56 faces upwardly. The propeller 54 may be lowered in place as the lower end of the propeller hub 55 receives the rotary table cone 24 and rests on the upper surface of the rotary table 22. In some applications, the collet assembly 74 may be deployed by initially inserting the collet shaft 76 through the central cone opening (not illustrated) in the collet cone 75 and then through the propeller hub 55 and the aligned or registering central cone opening (not illustrated) in the rotary table cone 24, respectively. Accordingly, the collet assembly 74 may stabilize the propeller 54 on the rotary table 22 as the parameter measurements are subsequently carried out.

The propeller parameter(s) which is/are to be carried out on the propeller 54 may be entered into the processor 81 (FIG. 13) of the control system 80 typically via the user interface 82 and may appear as a graphical representation on the display 83. These parameters may include but are not limited to the pitch, rake and squareness of the propeller 54. As used herein, the pitch of the propeller 54 refers to the distance the propeller 54 travels in one complete revolution. The pitch of the propeller 54 may be measured in inches, centimeters and/or other selected dimension or dimensions. The rake of the propeller 54 refers to the extent to which each propeller blade 56 is angled or bent in relation to the propeller hub 55 and is measured in degrees. The squareness of the propeller 54 refers to the distance which the adjacent propeller blades 56 are separated from each other and is measured in degrees.

In response to the parameter inputs, the processor 81 may actuate the rotary table motor 28 of the rotary assembly 20 to a achieve one or more desired 360-degree rotational positions of the propeller 54 on the rotary table 22. Additionally or alternatively, the processor 81 may actuate the carriage drive motor 41 to locate the sensor carriage 39 and displacement sensor 46 at the appropriate linear position along the displacement sensor travel path 47 (FIG. 11). The processor 81 may actuate the laser mirror system 116 (FIG. 15) of the displacement sensor 46 to emit the incident laser beam 68 against one or more target points on one or more of the propeller blades 56 of the propeller 54, as was heretofore described with respect to FIGS. 8-10. The reflected laser beam 69 may be reflected from each target point back to the displacement sensor 46, as was heretofore described with respect to FIG. 15 The laser mirror system 116 may utilize the triangulation method to determine the distance from the displacement sensor 46 to each target point on the propeller 54. The displacement sensor 46 may transmit the measured distance inputs to the processor 81 typically via the sensor cable 50 (FIG. 13) or wirelessly. In some applications, the displacement sensor 46 may obtain multiple radial scans of the propeller 54, as indicated by the concentric radial lines 72 in FIG. 12. Based on the 360-degree position of the rotary table 22 and/or the linear position of the sensor carriage 39 on the carriage rail 38, along with the target point distance inputs from the displacement sensor 46, the processor 81 may calculate and display the measured parameter calculations on the display 83 (FIG. 13) of the control system 80.

The processor 81 may determine the pitch typically by initially measuring the distances between points on the propeller blades 56 using the distance inputs from the displacement sensor 46. Using the measured distances, the processor 81 may then perform a known calculation to determine the pitch and may display the calculated pitch on the display 83 of the control system 80.

The processor 81 may determine the rake typically by initially measuring the distance from the displacement sensor 46 to target points on the propeller blades 56 which are close to the blade root 60 or propeller hub 55 typically as the rotary table motor 28 rotates the rotary table 22. The target points of the incident laser beam 68 which are located in a straight line out from the propeller hub 55 at each point in the radii scan may then be used to determine the extent to which each propeller blade 56 is bent with respect to the propeller hub 55. Based on this distance input from the displacement sensor 46, the processor 81 may perform a known calculation to determine the rake for each propeller blade 56 and may display the calculated rake on the display 83.

The processor 81 may determine the squareness of the propeller 54 typically by initially measuring the distance of a target point on one of the propeller blades 56 at a particular position of the displacement sensor 46 along the displacement sensor travel path 47 (FIG. 11) from the carriage drive motor 41. The processor 81 may then measure the same position of the target point on the next propeller blade 56 and then calculate the curvature distance between the two target points. The processor 81 may display the calculated squareness on the display 83.

After the desired parameters of the propeller 54 are calculated, the collet assembly 74 (FIG. 7) may be disassembled and the propeller 54 removed from the rotary table 22. The propeller 54 may be repaired, as needed, and then the parameter or parameters measured again. This process may be repeated until the calculated parameter or parameters of the propeller 54 conform to the desired parameter standards for repair.

It will be appreciated by those skilled in the art that the apparatus facilitates measuring various parameters such as pitch, rake and squareness of a marine propeller with accurate and repeatable results, particularly on small propellers. The apparatus may be utilized to independently or simultaneously scan both the pressure face and the suction face of a marine propeller or all surfaces of other objects. Due to the high angles involved and the short chord lengths on smaller propellers, an acceptable tolerance level of accuracy on a propeller measuring apparatus designed for larger propellers may be unacceptable on smaller propellers. The apparatus of the present disclosure can consistently deliver results within 0.05-0.10" accuracy in repeated testing on smaller marine propellers. It has been found that measurement accuracy needs to double when the propeller diameter is reduced by 50%. The need for this requirement is magnified by the fact that rpms impact the pitch increase in low-pitch propellers. A 10-pitch propeller requires only 0.3 inches of pitch differential to change the rpms by 3% (about 180 rpm on most of today's outboard motors), whereas a 3% change on a 30-pitch propeller would require a 0.9-inch pitch change. So, both smaller diameters and lower pitches on propellers impact the need for accuracy.

In a smaller propeller, the chord lengths are sometimes just 1" to 3" wide. Selecting the exact target point from which to begin measuring the leading edge of the propeller blade and the exact target point at which to stop measuring the pitch of the blade may be crucial. In operation of the apparatus of the disclosure, the apparatus will automatically find not only the leading edge but also the highest value on the trailing edge "cup zone" of the propeller blade, and then automatically trim the blade measurement to this point. Automatic high-point pick on the cup zone of the propeller blade increases accuracy and the speed of measurement greatly.

The ability of the apparatus to quickly obtain the data points and curve-fit a radius line for the propeller and the cup zone may enable the apparatus to output a graphic image or file showing the cup profile, a "best fit" cup radius and the height above the standard pitch line. This data can be computer-processed in seconds, saving extensive measurement time from using physical metal cup radius and cup height gauges.

Referring again to FIG. 13 of the drawings, since the apparatus 1 can scan a propeller 54 in a few seconds, the output of the apparatus 1 may also allow for creation of scanned files that can be input into the artificial intelligence driven robotic/CNC finishing cells 92 such that the exact casting shape can be compared to a design CAD model of the propeller 54 and an adaptive toolpath for manufacture or repair of the propeller 54 created.

In hand-driven pitch measurement devices, whether by laser or touch points with mechanically driven encoders, a significant degree of error can be introduced by the operator as he or she applies inconsistent hand pressure to the apparatus or alters the speed of rotation. By utilizing a servo-driven system that is completely hands-free, the measurements carried out using the apparatus of the present disclosure may be executed faster and much more consistently and are not subject to manipulation by the operator. On a small propeller, the scanning process time may be reduced by over 50% as opposed to a conventional manual device, with much more data being collected for enhanced functions and all of it collected with a great improvement in accuracy.

In some embodiments, the apparatus may also have an auto-ranging function which initiates the position of the displacement sensor 46 beyond the diameter of the propeller 54 and rotates the propeller 54 while moving the displacement sensor 46 along the displacement sensor travel path 47 (FIG. 11) towards the center of the propeller 54. This function may enable the apparatus 1 to recognize the number of propeller blades 56 and the exact diameter of each and compute the average blade diameter automatically. This function may eliminate error from mismeasurement or misentry of the propeller diameter by the operator. This function may further eliminate the need for the operator to keypunch the required data into the processor 81 prior to initiating parameter measurement.

As was heretofore described with respect to FIG. 7, in some embodiments, the precision, typically servo-controlled rotary table 22 may be fitted with the precision collet assembly 74 which allows for very rapid change of shafting and the use of a straight collet shaft 76 for proper orientation of the propeller 54. In some embodiments, the collet assembly 74 may include a set of quick-change tapered collet shafts 76 for use on smaller inboard propellers 54.

The speed of rotation of the propeller 54 or other object on the rotary table 22 may be according to a set rpm speed during the scanning process, or in some embodiments, may be a surface footage-driven number that computes and automatically adapts the blade velocity to the diameter of the propeller 54 to maintain optimum measurement accuracy. The scan speed for a small propeller 54 may need to be twice the speed of a scan for a propeller 54 that has twice the diameter of the small propeller 54.

As further illustrated in FIG. 13, in some embodiments, the apparatus 1 may utilize the curvature detection system 94 by which the pitch curvature may be detected to be approaching a level that might produce errors. Accordingly, the processor 81 may be programmed to automatically drop the rotary table motor 28 back to a slower rpm speed to maintain data integrity. This slow-down mode may also be triggered by a loss of acceptable data points within predetermined filter limits.

On smaller propellers 54, the propellers may be operated in a partially- or fully-surface piercing mode. Under these circumstances, a much more aggressive cup curvature for each propeller blade 56 may be required. The RPM impact of the cup may be greatly above norms for that which occurs on mild cupping of much larger propellers. Accordingly, the software loaded into the processor 81 of the control system 80 may allow an operator to "weight" the different sections of the blade radii in order to provide a reference pitch number that may correspond to a pitch factor number indicating the RPM impact of the large cup, even though the measured cup impact on traditional pitch measuring schemes may ignore this data.

In some embodiments, the apparatus 1 may curve-fit a line or spline on the radial data points, trim the line or spline to specified start and finish points and then utilize the line or spline for measurement of pitch data. Strictly averaging good data points vs filtered out data points that are typically lost in high angle portions of the blade may otherwise skew the pitch average to the flatter sections.

In some embodiments, the apparatus 1 may filter the data points not only between successive data points by maximum distance or angle but also average the output of the curvature of all the propeller blades 56, then use a smaller filter metric to restrict any data points that do not lie closely within the limits of the average blade profile.

In many circumstances, several of the propeller blades 56 may produce good scans with a problem sector on just one blade. By averaging all of the scans together to produce the average profile, then using this profile as a filter, errant points may be largely eliminated.

Figure 14:
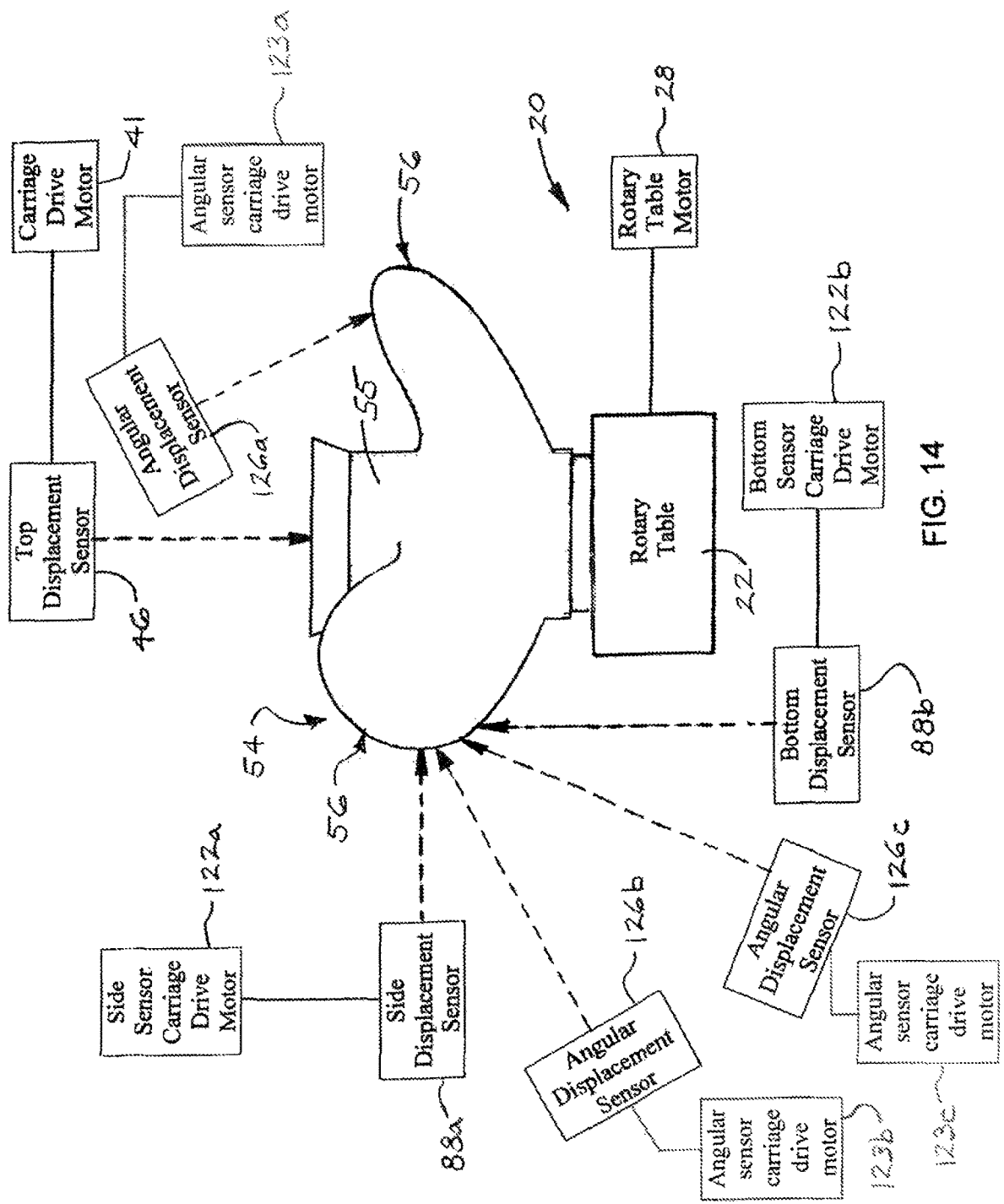
FIG. 14 is a block diagram illustrating an illustrative embodiment of the apparatuses with placement of various displacement sensors for measuring parameters of a marine propeller in typical application of the apparatus.

Referring again to FIGS. 13 and 14 of the drawings, in some embodiments, the apparatus 1 may utilize additional displacement sensors 88 with lasers that add additional angles of measurement. As illustrated in FIG. 14, these may include, for example and without limitation, at least one side displacement sensor 88a positioned to one or more sides of the propeller 54 and/or at least one bottom displacement sensor 88b positioned below the propeller 54. Additionally or alternatively, one or more angular displacement sensors 126a, 126b, 126c may be oriented at selected angles with respect to the propeller 54. Each side displacement sensor 88a and bottom displacement sensor 88b may be operably engaged by a corresponding side sensor carriage drive motor 122a and bottom sensor carriage drive motor 122b. Likewise, each angular displacement sensor 126a, 126b, 126c may be operably engaged by a corresponding angular sensor carriage drive motor 123a, angular sensor carriage drive motor 123b and angular sensor carriage drive motor 123c.

These additional displacement sensors 88 and/or angular displacement sensors 126 may utilize one or more additional axes of movement to position one or more lasers closer to 90 degrees to the surface normal and/or at closer distance once the general shape of the propeller blade 54 has been probed. Each of the additional displacement sensors 88 and the angular displacement sensors 126 may utilize at least one laser mirror system 116 (FIG. 15) or may use at least one high-resolution camera (not illustrated) to facilitate the distance measurements. The laser-operated displacement sensors 88 and angular displacement sensors 126 are typically most accurate and error-free when measuring against a surface at 90 degrees to the surface normal. In some embodiments, one or more of each displacement sensor 88 and angular displacement sensor 126 may be mounted on a corresponding rail-mounted carriage (not illustrated) and may be drivingly engaged for linear travel along the rail via the additional displacement sensor carriage drive motor(s) 122 (FIG. 13) and/or the angular sensor carriage drive motor(s) 123. The additional displacement sensors 88 and angular displacement sensors 126 may collect additional information on blade chord thickness and profile, overlapping blade data, and/or corroboration of other measured laser data, for example and without limitation. In some embodiments, the apparatus 1 may utilize the bad scan detector screen 95 (FIG. 13) to alert an operator in the event that any of the data points are visually out of the range of probability, with a reference of all propeller blades 56 scanned to indicate any particular blade-to-blade deviation.

In some embodiments, the additional displacement sensors 88 and angular displacement sensors 126 may be adjustable in height according to the knowledge of those skilled in the art. It will be recognized and understood that any number of additional placement sensors 88 and angular displacement sensors 126 may be utilized to measure surfaces on the propeller 54 along or within a horizontal axis or plane, a vertical axis or plane and any number of diagonal axes or planes between the horizontal and vertical axes or planes.

In some embodiments, the processor 81 of the control system 80 may be programmed to produce specialized reports on variable rake, camber factors, blade area calculations, blade area/pitch by surface footage velocity, pitch weighting, cup weighting and/or other propeller parameters.

It will be appreciated by those skilled in the art that the apparatus 1 may provide a hands free, servo driven laser propeller pitch measuring apparatus in a benchtop format in which the propeller 54 is rotated by the rotary table motor 28 under at least one fixed-position, horizontally-mounted displacement sensor 46 which moves with a precision servo drive/horizontal sensor carriage 39 to the centerline of the various programmed radii of target points on the propeller 54, based on user selection. The propeller 54 and/or other object to be measured may be rotated by the servo-powered rotary table 22, which is capable of high accuracy transmission of its position to the processor 81 of the control system 80 within 360 degrees of rotation. Once the propeller 54 is positioned on the rotary table 22, the operation may be completely driven by the processor 81, rotary table motor 28, carriage drive motor 41 and displacement sensor 46 in a hands-free operation. The result is an accurate and repeatable propeller measurement. Additionally, the displacement sensor 46 may be used for establishing the profile shape for an AI or robotic finishing system such as the robotic/CNC finishing cells 92 (FIG. 13).

In various embodiments, the apparatus 100 may have additional features including but not limited to:

variable adaptive frequency, variable adaptive power laser (pulsed);
automatic rotating;
automatic movement to additional radii;
automatic selection of the leading-edge beginning point;
automatic high-point selection of the cup zone;
uses such as quick scan for adaptive AI and robotic finishing on irregular shapes;
variable surface footage on propeller diameter/scan speed;
variable speed on curvature increase;
variable speed on point loss %;
point density reduction and curve fit a chord into a series of equidistant points;
data filtering based on maximum allowable angle between successive points;
pitch average by sector rather than by scanned point frequency;
bad scan detector screen with graphic representation of scan error;
auto range diameter by photo eye or laser scan, with rapid advance movement in auto range mode with backup at beam break and tip validation;
selection of propeller diameter by actual blade, average diameter or input diameter;
quick change shaft collet with high concentricity, accommodate straight or taper shafts with a straight mounting collet;
additional side displacement sensor with laser having variable vertical height;
bottom side displacement sensor having upward-pointing laser;
one or more left and right displacement sensors;
execution of each propeller radius twice and curve-fit a spline;
execute two lasers in tandem, following in each others track, using two different focal lengths, the first laser to establish the approximate blade location and the second laser to run closer to the surface;
operation of two lasers at 90-degree angles to each other;
operation of two lasers of different wavelengths;
two additional axes of movement to track the surface and operate the laser at angles as close to 90 degrees as possible, improving accuracy of points when high angles or curvatures are present;
negative air pressure, clean air filtration input for the sensor housing of each displacement sensor, the rotary table motor, the carriage drive motor and/or the carriage drive lead screw;
swing arm for loading heavy propellers on the rotary table; capability to weight the cupped section and/or other sectors to an overweight or underweight % versus other sectors; and
capability to obtain high point selection of the cup zone and an initial data point on the beginning of the cup zone, and perform straight pitch line measurement between the points, which results in an automatic overweighting of the cup zone.

Figure 16:
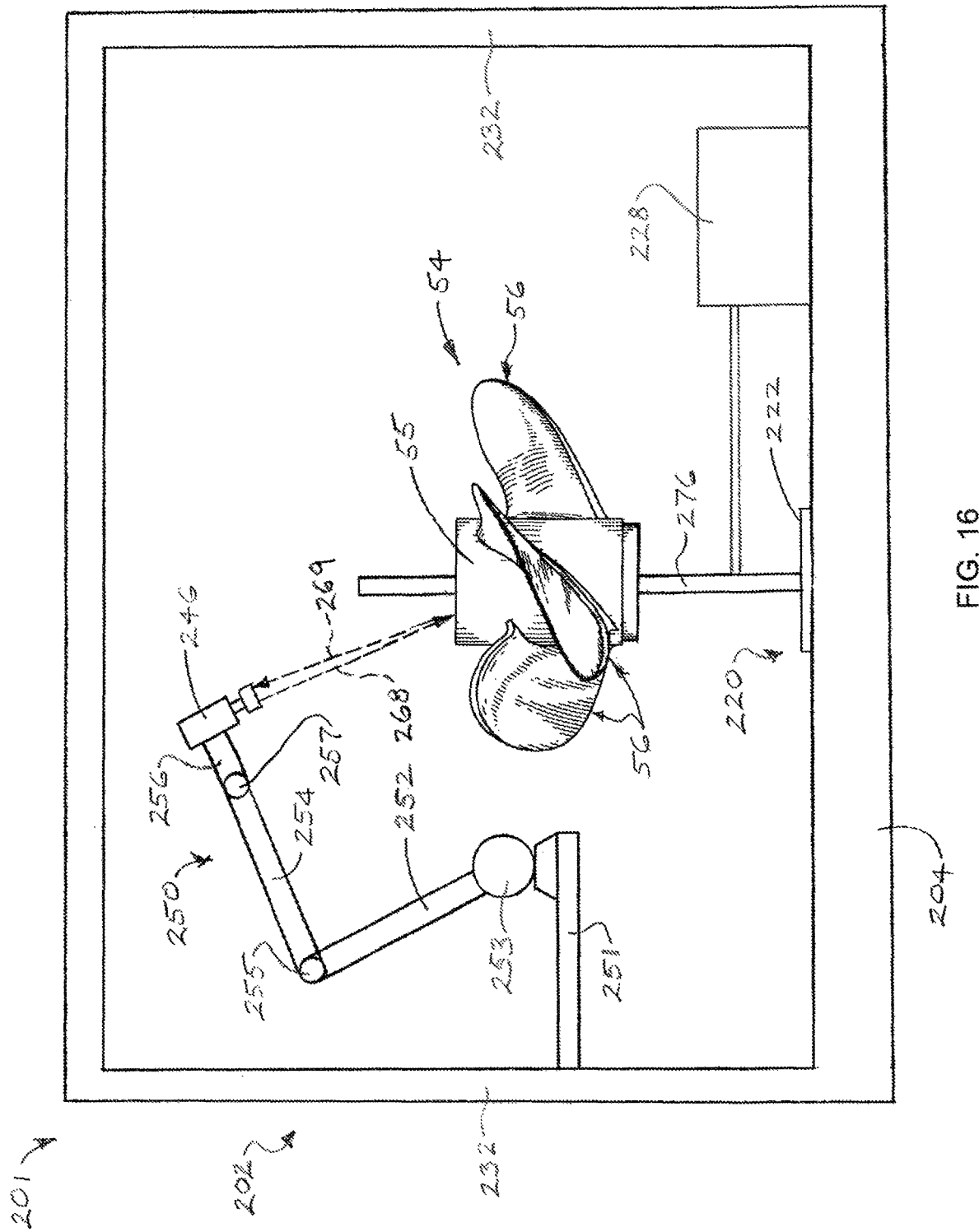
FIG. 16 is a front view of an alternative illustrative embodiment of the apparatuses having at least one sensor positioning arm for positioning at least one displacement sensor relative to the propeller.
Figure 17:
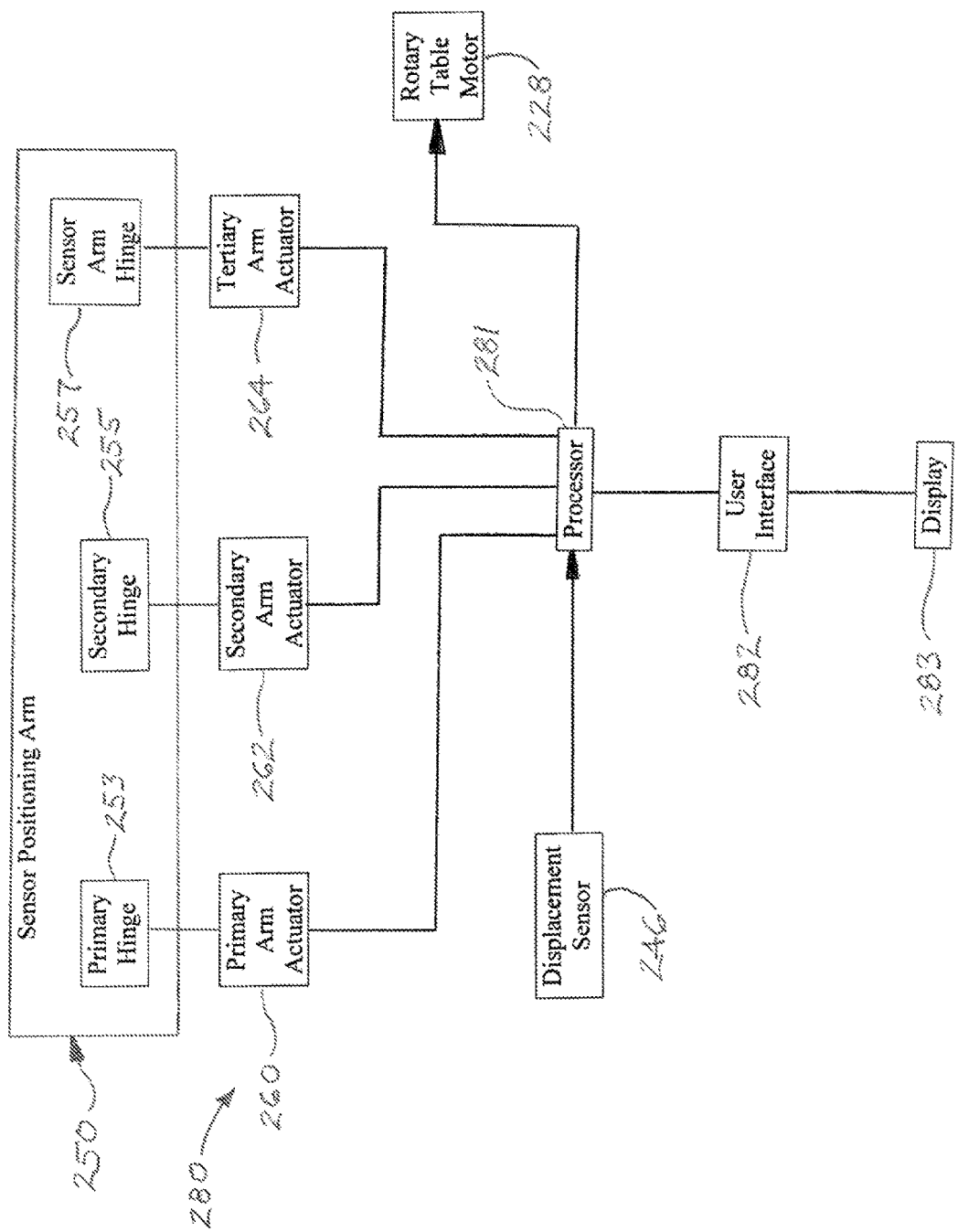
FIG. 17 is a block diagram illustrating a typical control system suitable for the apparatus illustrated in FIG. 16.

Referring next to FIGS. 16 and 17 of the drawings, an alternative illustrative embodiment of the apparatuses for measuring parameters of an object is generally indicated by reference numeral 201 in FIG. 16. In the apparatus 201, elements which are analogous to the respective elements of the apparatus 1 that was heretofore described with respect to FIGS. 1-15 are designated by the same respective numerals in the 201-299 series in FIG. 16. The apparatus 201 may include at least one robotic sensor positioning arm 250. Each sensor positioning arm 250 may include an arm base 251 which in some embodiments may be supported by the apparatus frame 202 according to the knowledge of those skilled in the art. A primary arm 252 may extend from the arm base 251 at a primary hinge 253. A secondary arm 254 may extend from the primary arm 252 at a secondary hinge 255. A sensor arm 256 may extend from the secondary arm 254 at a sensor arm hinge 257. At least one displacement sensor 246 may be supported by the sensor arm 256.

As illustrated in FIG. 17, in atypical control system 280 for the apparatus 201, at least one arm actuator 260, 262, 264 may operably engage the sensor positioning arm 250 to facilitate selective pivoting of the primary arm 252, the secondary arm 254 and the sensor arm 256 at the primary hinge 253, the secondary hinge 255 and the sensor arm hinge 257, respectively. For example and without limitation, in some embodiments, at least one primary arm actuator 260 may operably engage the primary hinge 253 to facilitate pivoting of the primary arm 252 with respect to the arm base 251. In like manner, at least one secondary arm actuator 262 may operably engage the secondary hinge 255 and at least one tertiary arm actuator 264 may operably engage the sensor arm hinge 257 of the sensor positioning arm 250 to facilitate pivoting of the secondary arm 254 with respect to the primary arm 252 and pivoting of the sensor arm 256 with respect to the secondary arm 254, respectively. The processor 281 of the control system 280 may controllably interface with the primary arm actuator 260, the secondary arm actuator 262 and the tertiary arm actuator 264 according to the knowledge of those skilled in the art. The control system 280 may have the same or similar components, features and capabilities to those of the control system 80 which was heretofore described with respect to FIG. 13. For example and without limitation, in some embodiments, the control system 280 may include one or more of the curvature detection system 94, the bad scan detector screen 95, the robotic/CNC finishing cells 92 and the selectable materials settings 86.

In some embodiments, the sensor positioning arm 250 may be configured for movement or positioning of the displacement sensor 246 along multiple axes according to the knowledge of those skilled in the art. For example and without limitation, the sensor positioning arm 250 may be configured to orient the displacement sensor 246 along or within a horizontal axis or plane, a vertical axis or plane and any number of diagonal axes or planes between the horizontal and vertical axes or planes. Accordingly, the sensor positioning arm 250 may be capable of orienting the displacement sensor 246 such that the incident laser beam 268 is as close as possible to 90 degrees with respect to the surface normal of whichever surface on the propeller 54 is being measured. The sensor positioning arm 250 may be operable alone or in combination with rotation of the propeller 54 via rotation of the rotary table 222. A non-limiting example of a robotic sensor positioning arm 250 which is suitable for the purpose includes the UNIVERSAL™ UR10 collaborative industrial robotic arm available from Universal Robots (www.universal-robots.com). A control system (not illustrated) such as the control system 80 which was heretofore described with respect to FIG. 13 may operably interface with the respective arm actuators for manual or programmed actuation of the sensor positioning arm 250 and orientation of the displacement sensor 246 at selective orientations or positions relative to the surfaces of the propeller 256. Accordingly, the displacement sensor 246 may emit an incident laser beam 268 and receive a reflected laser beam 269 to measure the surfaces of the propeller 54, typically as was heretofore described.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. An apparatus suitable for measuring pitch, rake, and squareness of a propeller having a propeller hub and a plurality of propeller blades extending outwardly from the propeller hub, comprising:
    an apparatus frame;
    a rotary table assembly including:
        a rotary table carried by the apparatus frame, the rotary table having a diameter or width and configured to support the propeller for rotation; and
        a rotary table motor operably engaging the rotary table for rotation;
    a carriage rail carried by the apparatus frame, the carriage rail disposed in fixed position relative to the rotary table and having a first end and a second end;
    a sensor carriage carried by and configured to traverse the carriage rail from the first end to the second end;
    a carriage drive motor engaging the sensor carriage, the carriage drive motor operable to displace the sensor carriage along the carriage rail; and
    at least one fixed-position displacement sensor carried by the sensor carriage and having a displacement sensor travel path passing over and traversing the diameter or width of the rotary table as the sensor carriage traverses the carriage rail, the at least one displacement sensor configured to measure distances between the at least one displacement sensor and surfaces on the propeller, the displacement sensor travel path configured to pass over a center and the entire diameter or width of the propeller as the at least one displacement sensor traverses from the first end to the second end of the carriage rail.

2. The apparatus of claim 1 further comprising a collet assembly configured to immobilize and stabilize the propeller on the rotary table.

3. The apparatus of claim 2 further comprising a rotary table cone carried by the rotary table, the rotary table cone having a rotary table cone opening; and wherein the collet assembly comprises a tapered collet cone configured to engage the propeller, the collet cone having a central collet cone opening; and an elongated collet shaft extending through the central collet cone opening in the collet cone and configured to extend through the propeller and through the rotary table cone opening in the rotary table cone.

4. The apparatus of claim 1 further comprising a carriage drive lead screw threadably engaging the sensor carriage and drivingly engaged by the carriage drive motor, and wherein the carriage drive lead screw facilitates selective axial travel of the sensor carriage along the carriage rail responsive to operation of the carriage drive motor.

5. The apparatus of claim 4 further comprising a slide rail carried by the apparatus frame, and wherein the carriage rail is carried by the slide rail in parallel, spaced-apart relationship to the slide rail.

6. The apparatus of claim 4 further comprising an air filtration system enclosing the carriage drive motor, the carriage drive lead screw and the at least one displacement sensor.

7. The apparatus of claim 6 wherein the air filtration system comprises an air filtration housing carried by the apparatus frame, an air filter communicating with the air filtration housing, at least one cooling fan in the air filtration housing and a fan motor drivingly engaging the at least one cooling fan, and the carriage rail, the carriage drive motor, the carriage drive lead screw and the at least one displacement sensor are contained inside the air filtration housing.

8. The apparatus of claim 1 wherein the at least one displacement sensor comprises at least one laser mirror system configured to emit an incident laser beam onto and receive a reflected laser beam from the propeller to measure the distances between the at least one displacement sensor and the surfaces on the propeller.

9. The apparatus of claim 1 wherein the apparatus frame comprises a frame base; a plurality of parallel, spaced-apart slide rail supports extending upwardly from the frame base; and a pair of slide rail support connectors extending between the plurality of parallel, spaced-apart slide rail supports on respective sides of the frame base, and wherein the carriage rail is carried by the pair of slide rail support connectors.

10. The apparatus of claim 1 further comprising a control system having a processor and a user interface and at least one display interfacing with the processor, and wherein the processor controllably interfaces with the rotary table motor of the rotary table assembly, the carriage drive motor and the at least one displacement sensor.

11. The apparatus of claim 10 further comprising at least one curvature detection system interfacing with the processor, the at least one curvature detection system configured to detect pitch curvature and cause the processor to adjust rotational speed of the rotary table to maintain data integrity if the pitch curvature approaches an unacceptable level.

12. The apparatus of claim 10 further comprising at least one bad scan detector screen interfacing with the processor.

13. The apparatus of claim 10 further comprising at least one robotic/CNC finishing cell interfacing with the processor.

14. The apparatus of claim 1 further comprising a housing or enclosure, and wherein the apparatus frame is enclosed in the housing or enclosure.

15. An apparatus suitable for measuring pitch, rake, and squareness of a propeller having a propeller hub and a plurality of propeller blades extending outwardly from the propeller hub, comprising:
   an apparatus frame;
   a rotary table assembly including:
      a rotary table carried by the apparatus frame, the rotary table having a diameter or width and configured to support the propeller for rotation; and
      a rotary table motor operably engaging the rotary table for rotation;
   a carriage rail carried by the apparatus frame, the carriage rail disposed in fixed position relative to the rotary table and having a first end and a second end;
   a sensor carriage carried by and configured to traverse the carriage rail from the first end to the second end;
   a carriage drive motor engaging the sensor carriage, the carriage drive motor operable to displace the sensor carriage along the carriage rail;
   at least one fixed-position displacement sensor carried by the sensor carriage and having a displacement sensor travel path passing over and traversing the diameter or width of the rotary table as the sensor carriage traverses the carriage rail, the displacement sensor configured to measure distances between the displacement sensor and surfaces on the propeller, the displacement sensor travel path configured to pass over a center and the entire diameter or width of the propeller as the at least one displacement sensor traverses from the first end to the second end of the carriage rail, the displacement sensor travel path exceeding an entire diameter or width of the propeller, the at least one displacement sensor configured to emit an incident laser beam onto and receive a reflected laser beam from the propeller to measure distances between the at least one displacement sensor and the surfaces on the propeller such that the incident laser beam emitted by the displacement sensor is capable of impinging on every portion the surfaces of the propeller;
   at least one additional displacement sensor disposed in proximity to the rotary table of the rotary table assembly and configured to measure at least one additional angle of measurement with respect to the propeller, the at least one additional displacement sensor including at least one of the following: at least one angular displacement sensor oriented at one or more angles with respect to the propeller, at least one side displacement sensor positioned to one or more sides of the propeller and at least one bottom displacement sensor positioned below the propeller;
   a control system including:
      a processor controllably interfacing with the rotary table motor of the rotary table assembly, the carriage drive motor, the at least one displacement sensor and the at least one additional displacement sensor;
      a user interface interfacing with the processor; and
      at least one display interfacing with the processor.

16. The apparatus of claim 15 wherein the at least one additional displacement sensor comprises the at least one angular displacement sensor configured to be oriented at selected angles with respect to the propeller.

17. The apparatus of claim 15 wherein the at least one additional displacement sensor comprises the at least one bottom displacement sensor configured to be positioned below the propeller.

18. The apparatus of claim 15 wherein the at least one additional displacement sensor comprises the at least one side displacement sensor configured to be positioned to at least one side of the propeller.

19. The apparatus of claim 15 further comprising at least one additional carriage drive motor interfacing with the processor and operably engaging the at least one additional displacement sensor to displace the at least one additional displacement sensor with respect to the propeller.

20. The apparatus of claim 19 wherein the at least one additional carriage drive motor comprises at least one angular sensor carriage drive motor operably engaging the at least one angular displacement sensor to displace the at least one angular displacement sensor with respect to the propeller.

21. The apparatus of claim 15 further comprising at least one of the following: at least one curvature detection system interfacing with the processor, at least one bad scan detector screen interfacing with the display of the control system and at least one robotic/CNC finishing cell interfacing with the processor of the control system, the at least one curvature detection system configured to detect pitch curvature and cause the processor to adjust rotational speed of the rotary table to maintain data integrity if the pitch curvature approaches an unacceptable level.

22. An apparatus suitable for measuring pitch, rake, and squareness of a propeller having a propeller hub and a plurality of propeller blades extending outwardly from the propeller hub, comprising:
   an apparatus frame;
   a rotary table assembly including:
      a rotary table carried by the apparatus frame, the rotary table configured to support the propeller for rotation; and
      a rotary table motor operably engaging the rotary table for rotation;
   at least one robotic sensor positioning arm;
   at least one displacement sensor carried by the at least one robotic sensor positioning arm, the at least one robotic sensor positioning arm configured for movement or positioning of the at least one displacement sensor along or within a horizontal axis or plane, a vertical axis or plane and any of a plurality of diagonal axes or planes between the horizontal axis or plane and the vertical axis or plane;
   the at least one displacement sensor configured to measure distances between the at least one displacement sensor and surfaces on the propeller; and
   a control system interfacing with the at least one displacement sensor, the control system configured to determine the pitch, rake, and squareness of the propeller based on the measured distances between the at least one displacement sensor and the surfaces on the propeller.

23. The apparatus of claim 22 wherein the at least one displacement sensor comprises at least one laser mirror system configured to emit an incident laser beam onto and receive a reflected laser beam from the propeller to measure distances between the displacement sensor and the surfaces on the propeller.

24. The apparatus of claim 22 wherein the at least one robotic sensor positioning arm comprises an arm base carried by the apparatus frame, a primary arm extending from the arm base at a primary hinge, a secondary arm extending from the primary arm at a secondary hinge and a sensor arm extending from the secondary arm at a sensor arm hinge, and the at least one displacement sensor is carried by the sensor arm.

25. The apparatus of claim 24 further comprising at least one arm actuator operably engaging the at least one robotic sensor positioning arm.

26. The apparatus of claim 25 wherein the at least one arm actuator comprises at least one primary arm actuator operably engaging the primary hinge to pivot the primary arm with respect to the arm base, at least one secondary arm actuator operably engaging the secondary hinge to pivot the secondary arm with respect to the primary arm and at least one tertiary arm actuator operably engaging the sensor arm hinge to pivot the sensor arm with respect to the secondary arm.

\* \* \* \* \*